(12) United States Patent
Konka et al.

(10) Patent No.: US 11,194,680 B2
(45) Date of Patent: Dec. 7, 2021

(54) TWO NODE CLUSTERS RECOVERY ON A FAILURE

(71) Applicant: Nutanix, Inc., San Jose, CA (US)

(72) Inventors: Pavan Kumar Konka, Milpitas, CA (US); Karan Gupta, San Jose, CA (US); Aashray Arora, Seattle, WA (US); Deepthi Srinivasan, Raleigh, NC (US)

(73) Assignee: Nutanix, Inc., San Jose, CA (US)

(*) Notice: Subject to any disclaimer, the term of this patent is extended or adjusted under 35 U.S.C. 154(b) by 0 days.

(21) Appl. No.: 16/041,348

(22) Filed: Jul. 20, 2018

(65) Prior Publication Data

US 2020/0026625 A1   Jan. 23, 2020

(51) Int. Cl.
   *G06F 11/20* (2006.01)
   *G06F 11/14* (2006.01)
   (Continued)

(52) U.S. Cl.
   CPC ........ *G06F 11/203* (2013.01); *G06F 9/45558* (2013.01); *G06F 11/0709* (2013.01);
   (Continued)

(58) Field of Classification Search
   CPC ............ G06F 11/0709; G06F 11/0751; G06F 11/0793; G06F 16/1774; G06F 16/2343; H04W 84/20
   See application file for complete search history.

(56) References Cited

U.S. PATENT DOCUMENTS 5,253,252 A   10/1993   Tobol
5,276,867 A   1/1994    Kenley et al.
(Continued)

FOREIGN PATENT DOCUMENTS

CN   103746997     4/2014
CN   110519112 A   11/2019
(Continued)

OTHER PUBLICATIONS

E.S., "Nutanix Two-Node Clusters", (Jun. 18, 2018), from http://vpash.com/nutanix/nutanix-two-node-clusters/, pp. all.

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Matthew M Kim
*Assistant Examiner* — Matthew N Putaraksa
(74) *Attorney, Agent, or Firm* — Vista IP Law Group, LLP

(57) ABSTRACT

Systems and methods for high availability computing systems. Systems and methods include disaster recovery of two-node computing clusters. A method embodiment commences upon identifying a computing cluster having two nodes, the two nodes corresponding to a first node and a second node that each send and receive heartbeat indications periodically while performing storage I/O operations. One or both of the two nodes detect a heartbeat failure between the two nodes, and in response to detecting the heartbeat failure, one or both of the nodes temporarily cease storage I/O operations. A witness node is accessed in an on-demand basis as a result of detecting the heartbeat failure. The witness performs a leadership election operation to provide a leadership lock to only one requestor. The leader then resumes storage I/O operations and performs one or more disaster remediation operations. After remediation, the computing cluster is restored to a configuration having two nodes.

24 Claims, 13 Drawing Sheets

(51) Int. Cl.
*G06F 11/07* (2006.01)
*H04L 12/24* (2006.01)
*H04L 29/08* (2006.01)
*H04L 12/26* (2006.01)
*G06F 9/455* (2018.01)

(52) U.S. Cl.
CPC ...... *G06F 11/1425* (2013.01); *H04L 41/0816* (2013.01); *H04L 41/0893* (2013.01); *H04L 43/10* (2013.01); *H04L 67/1051* (2013.01); *H04L 67/1097* (2013.01); *G06F 2009/4557* (2013.01); *G06F 2009/45562* (2013.01)

(56) References Cited

U.S. PATENT DOCUMENTS

| | | | |
|---|---|---|---|
| 5,664,144 A | 9/1997 | Yanai et al. |
| 5,870,555 A | 2/1999 | Pruett et al. |
| 5,884,308 A | 3/1999 | Foulston |
| 6,055,543 A | 4/2000 | Christensen et al. |
| 6,085,234 A | 7/2000 | Pitts et al. |
| 6,101,508 A | 8/2000 | Wolff |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,363,416 B1 | 3/2002 | Naeimi et al. |
| 6,442,602 B1 | 8/2002 | Choudhry |
| 6,684,397 B1 | 1/2004 | Byer et al. |
| 6,738,801 B1 | 5/2004 | Kawaguchi et al. |
| 6,928,589 B1 | 8/2005 | Pomaranski et al. |
| 6,963,914 B1 | 11/2005 | Breitbart et al. |
| 6,968,345 B1 | 11/2005 | Muhlestein |
| 7,120,631 B1 | 10/2006 | Vahalia et al. |
| 7,356,679 B1 | 4/2008 | Le et al. |
| 7,379,419 B2 | 5/2008 | Collins |
| 7,409,511 B2 | 8/2008 | Edwards et al. |
| 7,421,578 B1 | 9/2008 | Huang et al. |
| 7,461,374 B1 | 12/2008 | Balint et al. |
| 7,606,868 B1 | 10/2009 | Le et al. |
| 7,647,427 B1 | 1/2010 | Devarapalli |
| 7,702,843 B1 | 4/2010 | Chen et al. |
| 7,720,864 B1 | 5/2010 | Muth et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,890,529 B1 | 2/2011 | Srinivasan et al. |
| 7,934,117 B2 | 4/2011 | Kakivaya et al. |
| 7,937,453 B1 | 5/2011 | Hayden et al. |
| 7,937,455 B2 | 5/2011 | Saha et al. |
| 7,941,470 B2 | 5/2011 | Le et al. |
| 7,990,962 B2 | 8/2011 | Chang et al. |
| 8,051,252 B2 | 11/2011 | Williams |
| 8,051,262 B2 | 11/2011 | Ichikawa et al. |
| 8,095,810 B2 | 1/2012 | Matsuzawa et al. |
| 8,095,931 B1 | 1/2012 | Chen et al. |
| 8,190,588 B1 * | 5/2012 | Gupta ................. G06F 11/1662 |
| | | 707/703 |
| 8,219,769 B1 | 7/2012 | Wilk |
| 8,352,482 B2 | 1/2013 | Hansen |
| 8,352,608 B1 | 1/2013 | Keagy et al. |
| 8,365,167 B2 | 1/2013 | Beaty et al. |
| 8,392,680 B1 | 3/2013 | Natanzon et al. |
| 8,407,448 B1 | 3/2013 | Hayden et al. |
| 8,424,003 B2 | 4/2013 | Degenaro et al. |
| 8,447,728 B2 | 5/2013 | Prahlad et al. |
| 8,473,462 B1 | 6/2013 | Banerjee |
| 8,473,775 B1 | 6/2013 | Helmick |
| 8,484,163 B1 | 7/2013 | Yucel et al. |
| 8,484,356 B1 | 7/2013 | Douglis et al. |
| 8,539,076 B2 | 9/2013 | Nakano et al. |
| 8,543,790 B2 | 9/2013 | Chen et al. |
| 8,549,518 B1 | 10/2013 | Aron et al. |
| 8,601,471 B2 | 12/2013 | Beaty |
| 8,601,473 B1 | 12/2013 | Aron et al. |
| 8,635,351 B2 | 1/2014 | Astete et al. |
| 8,646,089 B2 | 2/2014 | Jayanthi et al. |
| 8,688,660 B1 | 4/2014 | Sivasubramanian et al. |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,838,923 B2 | 9/2014 | Prahlad et al. |
| 8,850,130 B1 | 9/2014 | Aron et al. |
| 8,863,124 B1 | 10/2014 | Aron |
| 8,898,668 B1 | 11/2014 | Costea |
| 8,914,429 B2 | 12/2014 | Pitts |
| 8,935,563 B1 | 1/2015 | Rajaa et al. |
| 8,949,557 B2 | 2/2015 | Kamei et al. |
| 8,966,188 B1 | 2/2015 | Bardale |
| 8,983,952 B1 | 3/2015 | Zhang et al. |
| 8,996,783 B2 | 3/2015 | Huang et al. |
| 9,009,106 B1 | 4/2015 | Aron et al. |
| 9,032,248 B1 | 5/2015 | Petty |
| 9,043,567 B1 | 5/2015 | Modukuri et al. |
| 9,060,014 B2 | 6/2015 | Crowley |
| 9,069,708 B2 * | 6/2015 | Gill ................. G06F 9/45533 |
| 9,152,628 B1 | 10/2015 | Stacey et al. |
| 9,154,535 B1 | 10/2015 | Harris |
| 9,201,698 B2 | 12/2015 | Ashok et al. |
| 9,201,704 B2 | 12/2015 | Chang et al. |
| 9,201,887 B1 | 12/2015 | Earl et al. |
| 9,213,513 B2 | 12/2015 | Hartz et al. |
| 9,244,674 B2 | 1/2016 | Waterman et al. |
| 9,244,969 B1 | 1/2016 | Love et al. |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,274,817 B1 | 3/2016 | Fan et al. |
| 9,286,298 B1 | 3/2016 | Gillett, Jr. |
| 9,286,344 B1 | 3/2016 | Bhardwaj et al. |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,389,887 B1 | 7/2016 | Aron et al. |
| 9,405,566 B2 | 8/2016 | Chawla et al. |
| 9,411,628 B2 | 8/2016 | Bezbaruah et al. |
| 9,448,887 B1 | 9/2016 | Ben Dayan et al. |
| 9,497,257 B1 | 11/2016 | Love et al. |
| 9,513,946 B2 | 12/2016 | Sevigny et al. |
| 9,519,596 B2 | 12/2016 | Coppola et al. |
| 9,535,907 B1 | 1/2017 | Stringham |
| 9,563,555 B2 | 2/2017 | Flynn et al. |
| 9,571,561 B2 | 2/2017 | Jang |
| 9,619,257 B1 | 4/2017 | Aron et al. |
| 9,634,990 B2 | 4/2017 | Lee |
| 9,639,588 B2 | 5/2017 | Cheng |
| 9,652,265 B1 | 5/2017 | Narayanasamy et al. |
| 9,690,670 B1 | 6/2017 | Paulzagade et al. |
| 9,740,436 B2 | 8/2017 | Fiebrich-kandler et al. |
| 9,740,723 B2 | 8/2017 | Prahlad et al. |
| 9,747,287 B1 | 8/2017 | Bhardwaj et al. |
| 9,772,866 B1 | 9/2017 | Aron et al. |
| 9,832,136 B1 | 11/2017 | Gibson |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,893,988 B2 | 2/2018 | Agarwal et al. |
| 9,898,522 B2 | 2/2018 | Cole et al. |
| 9,940,154 B2 | 4/2018 | Ramani et al. |
| 9,946,573 B2 | 4/2018 | Mcdermott |
| 10,009,215 B1 | 6/2018 | Shorey |
| 10,050,862 B2 | 8/2018 | Nambiar et al. |
| 10,083,022 B2 | 9/2018 | Fukui et al. |
| 10,084,873 B2 | 9/2018 | Dornemann |
| 10,095,506 B2 | 10/2018 | Gopalapura Venkatesh et al. |
| 10,101,989 B2 | 10/2018 | Sinha et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,210,172 B1 * | 2/2019 | Konig ................... H04L 67/06 |

(56) References Cited

U.S. PATENT DOCUMENTS

| | | |
|---|---|---|
| 10,248,657 B2 | 4/2019 | Prahlad et al. |
| 10,367,753 B2 | 7/2019 | Schultze et al. |
| 10,394,547 B2 | 8/2019 | Fukui et al. |
| 10,419,426 B2 | 9/2019 | Bakshan et al. |
| 10,523,592 B2 | 12/2019 | Byers et al. |
| 10,530,742 B2 | 1/2020 | Shah et al. |
| 10,534,634 B2 | 1/2020 | Yang et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,809,998 B2 | 10/2020 | Gopalapura Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 2002/0120763 A1 | 8/2002 | Miloushev et al. |
| 2002/0133491 A1 | 9/2002 | Sim et al. |
| 2003/0115218 A1 | 6/2003 | Bobbitt et al. |
| 2003/0163597 A1 | 8/2003 | Hellman et al. |
| 2003/0195942 A1 | 10/2003 | Muhlestein et al. |
| 2004/0054777 A1 | 3/2004 | Ackaouy et al. |
| 2004/0210591 A1 | 10/2004 | Hirschfeld et al. |
| 2004/0267832 A1 | 12/2004 | Wong et al. |
| 2005/0094574 A1* | 5/2005 | Han ............ H04W 84/20 370/254 |
| 2005/0120160 A1 | 6/2005 | Plouffe et al. |
| 2005/0120180 A1 | 6/2005 | Schornbach et al. |
| 2005/0125503 A1 | 6/2005 | Iyengar et al. |
| 2005/0193245 A1 | 9/2005 | Hayden et al. |
| 2005/0201272 A1* | 9/2005 | Wang ............ H04L 45/02 370/216 |
| 2005/0210461 A1 | 9/2005 | Srivastava et al. |
| 2005/0226059 A1 | 10/2005 | Kavuri et al. |
| 2005/0228798 A1 | 10/2005 | Shepard et al. |
| 2005/0268298 A1 | 12/2005 | Hunt et al. |
| 2006/0010227 A1 | 1/2006 | Atluri |
| 2006/0047685 A1 | 3/2006 | Dearing et al. |
| 2006/0069912 A1 | 3/2006 | Zheng et al. |
| 2006/0080657 A1* | 4/2006 | Goodman ............ G06F 9/542 717/177 |
| 2006/0136781 A1 | 6/2006 | Lamport |
| 2006/0206901 A1 | 9/2006 | Chan |
| 2006/0224918 A1 | 10/2006 | Koike |
| 2006/0225065 A1 | 10/2006 | Chandhok et al. |
| 2007/0022129 A1 | 1/2007 | Bahar et al. |
| 2007/0038913 A1 | 2/2007 | Allen et al. |
| 2007/0100905 A1 | 5/2007 | Masters et al. |
| 2007/0171921 A1 | 7/2007 | Wookey et al. |
| 2007/0271561 A1 | 11/2007 | Winner et al. |
| 2007/0300220 A1 | 12/2007 | Seliger et al. |
| 2008/0098194 A1 | 4/2008 | Hashimoto et al. |
| 2008/0104589 A1 | 5/2008 | Mccrory et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt et al. |
| 2008/0201414 A1 | 8/2008 | Amir et al. |
| 2008/0201457 A1 | 8/2008 | London |
| 2008/0208938 A1* | 8/2008 | Lin ............ G06F 16/2343 |
| 2008/0270677 A1 | 10/2008 | Kolakowski |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0100248 A1 | 4/2009 | Kami |
| 2009/0113034 A1 | 4/2009 | Krishnappa et al. |
| 2009/0144720 A1 | 6/2009 | Roush et al. |
| 2009/0158082 A1 | 6/2009 | Jain et al. |
| 2009/0171971 A1 | 7/2009 | Goddard et al. |
| 2009/0193272 A1 | 7/2009 | Matsuzawa et al. |
| 2009/0216975 A1 | 8/2009 | Halperin et al. |
| 2009/0248870 A1 | 10/2009 | Kamei et al. |
| 2009/0249470 A1 | 10/2009 | Litvin et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2009/0290572 A1 | 11/2009 | Gonia et al. |
| 2010/0042869 A1 | 2/2010 | Szabo et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0110150 A1 | 5/2010 | Xu et al. |
| 2010/0138921 A1 | 6/2010 | Na et al. |
| 2010/0162226 A1 | 6/2010 | Borissov et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0262717 A1 | 10/2010 | Critchley |
| 2010/0275205 A1 | 10/2010 | Nakajima |
| 2011/0022694 A1 | 1/2011 | Dalal et al. |
| 2011/0022695 A1 | 1/2011 | Dalal et al. |
| 2011/0022812 A1 | 1/2011 | Van et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0107135 A1 | 5/2011 | Andrews et al. |
| 2011/0119763 A1 | 5/2011 | Wade et al. |
| 2011/0125835 A1 | 5/2011 | Soltis |
| 2011/0161299 A1 | 6/2011 | Prahlad et al. |
| 2011/0173493 A1 | 7/2011 | Armstrong et al. |
| 2011/0179414 A1 | 7/2011 | Goggin et al. |
| 2011/0184993 A1 | 7/2011 | Chawla |
| 2011/0185292 A1 | 7/2011 | Chawla et al. |
| 2011/0225574 A1 | 9/2011 | Khalidi et al. |
| 2011/0239213 A1 | 9/2011 | Aswani et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0078948 A1 | 3/2012 | Darcy |
| 2012/0081395 A1 | 4/2012 | Adi et al. |
| 2012/0084381 A1 | 4/2012 | Alladi et al. |
| 2012/0117555 A1 | 5/2012 | Banerjee et al. |
| 2012/0166866 A1 | 6/2012 | Rao et al. |
| 2012/0222089 A1 | 8/2012 | Whelan et al. |
| 2012/0233463 A1 | 9/2012 | Holt et al. |
| 2012/0233608 A1 | 9/2012 | Toeroe |
| 2012/0243795 A1 | 9/2012 | Head et al. |
| 2012/0254342 A1 | 10/2012 | Evans |
| 2012/0254445 A1 | 10/2012 | Kawamoto et al. |
| 2012/0266162 A1 | 10/2012 | Baron |
| 2012/0266231 A1 | 10/2012 | Spiers et al. |
| 2012/0272237 A1 | 10/2012 | Baron |
| 2012/0290630 A1 | 11/2012 | Aizman et al. |
| 2012/0310892 A1 | 12/2012 | Dam et al. |
| 2012/0317142 A1 | 12/2012 | Broecheler et al. |
| 2012/0324183 A1 | 12/2012 | Chiruvolu et al. |
| 2013/0007741 A1 | 1/2013 | Britsch et al. |
| 2013/0036323 A1 | 2/2013 | Goose et al. |
| 2013/0046740 A1 | 2/2013 | Li et al. |
| 2013/0054973 A1 | 2/2013 | Fok et al. |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0138995 A1 | 5/2013 | Sivaramakrishnan et al. |
| 2013/0151888 A1 | 6/2013 | Bhattiprolu et al. |
| 2013/0152077 A1 | 6/2013 | Leitman et al. |
| 2013/0152085 A1 | 6/2013 | Amore et al. |
| 2013/0174246 A1 | 7/2013 | Schrecker et al. |

(56) References Cited

U.S. PATENT DOCUMENTS

| | | |
|---|---|---|
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0219030 A1 | 8/2013 | Szabo |
| 2013/0227379 A1 | 8/2013 | Gupta et al. |
| 2013/0227550 A1 | 8/2013 | Weinstein et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0235774 A1 | 9/2013 | Jo et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2013/0304694 A1 | 11/2013 | Barreto et al. |
| 2013/0332771 A1 | 12/2013 | Salapura et al. |
| 2014/0006708 A1 | 1/2014 | Huynh et al. |
| 2014/0025796 A1 | 1/2014 | Vibhor et al. |
| 2014/0052877 A1 | 2/2014 | Mao |
| 2014/0059392 A1 | 2/2014 | Ren et al. |
| 2014/0068612 A1 | 3/2014 | Torrey |
| 2014/0068711 A1 | 3/2014 | Schweitzer, III et al. |
| 2014/0089259 A1 | 3/2014 | Cheng |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0101649 A1 | 4/2014 | Kamble |
| 2014/0109172 A1 | 4/2014 | Barton et al. |
| 2014/0115182 A1 | 4/2014 | Sabaa et al. |
| 2014/0123138 A1 | 5/2014 | Lee et al. |
| 2014/0143831 A1 | 5/2014 | Fieweger |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0164831 A1* | 6/2014 | Merriman ............ G06F 11/1458 714/20 |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0222953 A1 | 8/2014 | Karve et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0310710 A1 | 10/2014 | Lubsey et al. |
| 2014/0359612 A1 | 12/2014 | D'Amato et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039763 A1 | 2/2015 | Chaudhary et al. |
| 2015/0039837 A1 | 2/2015 | Quan et al. |
| 2015/0058298 A1 | 2/2015 | Earl et al. |
| 2015/0081644 A1 | 3/2015 | Pitts |
| 2015/0095788 A1 | 4/2015 | Thiele et al. |
| 2015/0106325 A1 | 4/2015 | Cole et al. |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0178019 A1 | 6/2015 | Hegdal et al. |
| 2015/0205618 A1 | 7/2015 | Bailey et al. |
| 2015/0205639 A1 | 7/2015 | Matsumoto et al. |
| 2015/0213032 A1 | 7/2015 | Powell et al. |
| 2015/0220324 A1 | 8/2015 | Arcese et al. |
| 2015/0242291 A1 | 8/2015 | Chang et al. |
| 2015/0244802 A1 | 8/2015 | Simoncelli |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0032653 A1 | 11/2015 | Cui et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0347775 A1 | 12/2015 | Bie et al. |
| 2016/0034555 A1 | 2/2016 | Rahut et al. |
| 2016/0050118 A1* | 2/2016 | Blanco ............ H04W 4/021 370/254 |
| 2016/0057009 A1 | 2/2016 | Kadayam et al. |
| 2016/0070492 A1 | 3/2016 | Cherubini et al. |
| 2016/0077936 A1 | 3/2016 | Tang et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0204977 A1 | 7/2016 | Cui et al. |
| 2016/0216993 A1 | 7/2016 | Beckwith et al. |
| 2016/0224363 A1 | 8/2016 | Joy |
| 2016/0301766 A1 | 10/2016 | Ionescu et al. |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0359955 A1 | 12/2016 | Gill et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0094002 A1 | 3/2017 | Kumar et al. |
| 2017/0109184 A1 | 4/2017 | Ramani et al. |
| 2017/0160983 A1 | 6/2017 | Fiske et al. |
| 2017/0177638 A1 | 6/2017 | Bhosale et al. |
| 2017/0206074 A1 | 7/2017 | Arcese et al. |
| 2017/0206207 A1 | 7/2017 | Bondurant et al. |
| 2017/0214738 A1 | 7/2017 | Agarwal et al. |
| 2017/0220661 A1 | 8/2017 | Cao et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Venkatesh et al. |
| 2017/0235764 A1 | 8/2017 | Sharpe et al. |
| 2017/0235950 A1 | 8/2017 | Venkatesh et al. |
| 2017/0242599 A1 | 8/2017 | Patnaik et al. |
| 2017/0262346 A1 | 9/2017 | Pradhan et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |

(56) References Cited

U.S. PATENT DOCUMENTS

| | | |
|---|---|---|
| 2018/0004766 A1 | 1/2018 | Darling |
| 2018/0062993 A1 | 3/2018 | Wu et al. |
| 2018/0129426 A1 | 5/2018 | Aron et al. |
| 2018/0143845 A1 | 5/2018 | Chawla et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0205787 A1 | 7/2018 | Ben Dayan et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Gopalapura Venkatesh et al. |
| 2019/0079747 A1 | 3/2019 | Sinha et al. |
| 2019/0129808 A1 | 5/2019 | Acharya et al. |
| 2019/0196718 A1 | 6/2019 | Pai et al. |
| 2019/0207925 A1 | 7/2019 | Anantha Padmanaban et al. |
| 2019/0286832 A1* | 9/2019 | Szeto ................ H04L 63/102 |
| 2019/0332683 A1 | 10/2019 | Thummala et al. |
| 2020/0007530 A1 | 1/2020 | Mohamad Abdul et al. |
| 2020/0036647 A1 | 1/2020 | Gupta et al. |
| 2020/0081704 A1 | 3/2020 | Bafna et al. |
| 2020/0106669 A1 | 4/2020 | Dhillon et al. |
| 2020/0274869 A1 | 8/2020 | Tahenakos et al. |

FOREIGN PATENT DOCUMENTS

| | | | |
|---|---|---|---|
| EP | 1 229 443 A2 | 8/2002 | |
| WO | WO 2010050944 | 5/2010 | |
| WO | WO 2011078646 A1 | 6/2011 | |
| WO | WO 2014200564 A1 | 12/2014 | |
| WO | WO 2016018446 | 2/2016 | |
| WO | WO 2020180291 A1 | 9/2020 | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
"Configuring a Witness (two-node cluster)" (Jul. 16, 2018), 3 pages.
Gupta, Upasna. "Unlocking the ROBO/Edge IT Landscape with the Launch of Nutanix 1-node Cluster" (Jan. 19, 2018), 7 pages.

Non-final Office Action dated Jul. 7, 2015 for related U.S. Appl. No. 14/278,363.
Non-final Office Action dated Jul. 16, 2015 for related U.S. Appl. No. 14/584,466.
International Search Report and Written Opinion dated Aug. 20, 2015, for related PCT Patent Application No. PCT/US15/31096, 8 pages.
International Search Report and Written Opinion dated Aug. 26, 2015, for related PCT Patent Application No. PCT/US15/31096, 8 pages.
Final Office Action dated Feb. 25, 2016 for related U.S. Appl. No. 14/584,466.
Final Office Action dated Mar. 23, 2016 for related U.S. Appl. No. 14/278,363.
Notice of Allowance and Fee(s) due dated Jul. 19, 2016 for related U.S. Appl. No. 14/206,869.
Lamport, Leslie "Paxos Made Simple," dated Nov. 1, 2001, 14 pages.
Alexander Shraer, et al., "Dynamic Reconfiguration of Primary/Backup Clusters," dated 2011, 13 pages.
Notice of Allowance and Fee(s) due dated Oct. 30, 2015 for related U.S. Appl. No. 14/144,520.
Wikipedia, "Compare-and-swap," Nov. 9, 2015, 6 pages.
International Search Report and Written Opinion dated Aug. 7, 2015, for corresponding PCT Patent Application No. PCT/US2015/030026, 10 pages.
Non-final Office Action dated Jul. 17, 2015 for related U.S. Appl. No. 14/206,869.
PCT International Search Report and Written Opinion dated Jun. 15, 2015 for related PCT Patent Application No. PCT/US2015/020139.
Final Office Action dated Jan. 25, 2016 for related U.S. Appl. No. 14/206,869.
Non-final Office Action dated Sep. 22, 2016 for related U.S. Appl. No. 14/584,466.
Citrix, "Citrix XenServer 6.0 Administrator's Guide", Copyright 2012 Citrix Systems, Inc., 207 pages (PCM Nutanix-023 ref).
John L Hufferd, Hufferd Enterprises, SNIA, "IP Storage Protocols: iSCSI", Copyright 2011 Storage Networking Industry Association, 46 pages (PCM Nutanix-032 ref).
VMware, Technical White Paper, "Multipathing Configuration for Software iSCSI Using Port Binding", Copyright 2012 Vmware, Inc., 15 pages (PCM Nutanix-032 ref).
Non-final Office Action dated Oct. 7, 2016 for related U.S. Appl. No. 14/278,363.
Notice of Allowance and Fee(s) due dated Oct. 24, 2016 for related U.S. Appl. No. 14/206,869.
Non-final Office Action dated Nov. 1, 2016 for related U.S. Appl. No. 14/708,091.
Notice of Allowance and Fee(s) due dated Apr. 5, 2017 for related U.S. Appl. No. 14/584,466.
Ajmani et al., "Scheduling and Simulation: How to Upgrade Distributed Systems," HotOS IX: The 9th Workshop on Hot Topics in Operating Systems, USENIX, 2003, pp. 43-48.
Kochut, Andrzej and Alexei Karve, "Leveraging Local Image Redundancy for Efficient Virtual Machine Provisioning," 2012 IEEE Network Operations and Management Symposium, Jun. 8, 2012, pp. 179-187.
Soules et al.; "Metadata Efficiency in a Comprehensive Versioning File System", May 2002, CMU-CS-02-145, School of Computer Science, Carnegie Mellon University, Pittsburgh, PA 15213, 33 pages.
Notice of Allowance and Fee(s) due dated Apr. 10, 2017 for related U.S. Appl. No. 14/278,363.
Final Office Action dated Apr. 20, 2017 for related U.S. Appl. No. 14/708,091.
Notice of Allowance and Fee(s) due dated May 15, 2017 for related U.S. Appl. No. 15/069,961.
Non-Final Office Action dated Jan. 26, 2017 for related U.S. Appl. No. 15/069,961.
Non-Final Office Action dated Jul. 12, 2017 for related U.S. Appl. No. 14/610,285.
European Search Report dated May 5, 2017 for related EP Application No. 15792334.3, 13 pages.

(56) References Cited

OTHER PUBLICATIONS

European Search Report dated May 19, 2017 for related EP Application No. 15788922.1, 11 pages.
Non-Final Office Action dated Aug. 24, 2017 for related U.S. Appl. No. 14/708,091.
Final Office Action dated Jan. 9, 2018 for related U.S. Appl. No. 14/610,285.
European Extended Search Report dated Jan. 15, 2018 for related EP Application No. 15762234.1, 19 pages.
Final Office Action dated Feb. 27, 2018 for related U.S. Appl. No. 14/708,091.
Advisory Action dated May 18, 2018 for related U.S. Appl. No. 14/708,091.
Non-Final Office Action dated Jun. 7, 2018 for related U.S. Appl. No. 15/294,422.
Non-Final Office Action dated Jun. 29, 2018 for related U.S. Appl. No. 15/160,347.
Notice of Allowance dated Sep. 6, 2018 for related U.S. Appl. No. 14/708,091, 8 pages.
First Office Action dated Jul. 30, 2018 for related European Application No. 15762234.1, 6 pages.
Non-Final Office Action dated Nov. 14, 2018 for related U.S. Appl. No. 15/678,893, 7 pages.
Notice of Allowance dated Nov. 20, 2018 for related U.S. Appl. No. 15/294,422, 7 pages.
Intention to Grant dated Jan. 3, 2019 for related EP Application No. 15792334.3, 7 pages.
Final Office Action dated Jan. 28, 2019 for related U.S. Appl. No. 15/160,347, 16 pages.
Notice of Allowance dated Mar. 20, 2019 for related U.S. Appl. No. 15/678,893, 5 pages.
Notice of Allowance dated Mar. 26, 2019 for related U.S. Appl. No. 15/294,422, 7 pages.
Non-Final Office Action dated Sep. 6, 2019 for related U.S. Appl. No. 15/160,347.
Notice of Allowance dated Nov. 19, 2019 for related U.S. Appl. No. 14/708,091.
Notice of Allowance dated Dec. 27, 2019 for related U.S. Appl. No. 14/610,285.
Final Office Action dated Mar. 16, 2020 for related U.S. Appl. No. 15/160,347.
"Liu, M. ""Fine-Grained Replicated State Machines for a Cluster Storage System""", in the Proceedings of the 17th USENIX Symposium on Networked Systems Design and Implementation (NSDI '20), (Feb. 25-27, 2020)".
Junqueira, F. P., "Zab: High-performance broadcast for primary-backup systems", 2011 IEEE/IFIP 41st International Conference on Dependable Systems & Networks (DSN), (Jun. 27-30, 2011).
Redis, "Redis Sentinel Documentation", (Jul. 23, 2012), date retrieved from google.
RABBITMQ, "Quorum Queues", (Nov. 14, 2019), date retrieved from google.
Cao, W.,"PolarFS: An Ultra-low Latency and Failure Resilient Distributed File System for Shared Storage Cloud Database", Proceedings of the VLDB Endowment, vol. 11, No. 12, (Aug. 2018).
Alibaba Cloud, "AliSQL X-Cluster: An MySQL Database with Superior Performance and Strong Consistency", (Dec. 8, 2019).
Rivera, R., "VMware Virtual SAN: Witness Component Deployment Logic", VMware vSphere Bloi, (Apr. 1, 2014).
"New VMware HCL category: vSphere Metro Stretched Cluster", Virtual Geek, (Oct. 5, 2011).
Lakkapragada, S. et al., "Site Recovery Manager and Stretched Storage: Tech Preview of a New Approach to Active-Active Data Centers", VMware, (Nov. 2014).
Epping, D., "Stretched vCloud Director Infrastructure", VMware, (Jan. 23, 2013).
Bernasconi, A. et al., "IBM SAN and SVC Stretched Cluster and VMware Solution Implementation", IBM Redbooks, (Apr. 2013).
Ashish, S. et al., "IBM SAN Volume Controller Stretched Cluster with PowerVM and PowerHA", IBM Redbooks, (Jul. 2013).

Dell, "Multi-AZ (stretched cluster)", Architecture Guide—VMware Cloud Foundation 3.10.01 on VxRail, Dell Technologies, (Oct. 2001).
Daveberm, "Step-By-Step: Configuring a 2-Node Multi-Site Cluster On Windows Server 2008 R2—Part 1", Clustering for Mere Mortals, (Sep. 15, 2009).
"Failover Clustering (III)", Networks & Servers Blog, (Sep. 2011).
Sarmiento, E., "Force Start a Windows Server Failover Cluster without a Quorum to bring a SQL Server Failover Clustered Instance Online", (Aug. 22, 2014).
Horenbeeck, M. V., "Spooky! The Curious Case of the 'Ghost' File Share Witness . . . ", (Jul. 15, 2014).
VMware, "Administering VMware Virtual SAN: VMware vSphere 6.5, vSAN 6.6", VMware, (Jun. 26, 2017).
Littman, M. L., "The Witness Algorithm: Solving Partially Observable Markov Decision Process", Brown University, (Dec. 1994).
Oracle, "Deploying Microsoft SQL Server Always On Availability Groups", Oracle White Paper, (Sep. 2018).
Enterpris EDB, "EDB Failover Manager Guide: Failover Manager Version 2.0.3", EnterpriseDB Corporation, (Dec. 18, 2015).
"Explaining the Stormagic SvSAN Witness", White Paper, (Aug. 29, 2018).
"2016 Failover cluster using Azure blob as a cluster quorum", Teckadmin, (Mar. 31, 2019).
Microsoft, "High Availability Solutions: SQL Server 2012 Books Online", Microsoft (Jun. 2012).
Mitchell, D., "Introduction to VMware vSAN™ for VMware Cloud Providers™," Version 2.9, VMware, (Jan. 2018).
Mitchell, D., "Introduction to VMware vSAN™ for VMware vCloud Air™ Network", Version 2.7, VMware, (Feb. 2017).
Paderin, M. "Analysis of Server Clustering Its Uses and Implementation", Bachelor's thesis Information Technology, (Dec. 2017).
VMware, "Virtualizing Microsoft Applications on VMware Virtual SAN", Reference Architecture, VMware, (Apr. 2, 2015).
Deschner, G., "Implementing the Witness protocol in Samba", Redhat, (Jun. 22, 2015).
Deschner, G., "Cluster improvements in Samba4", Redhat, (May 30, 2016).
Ngyuen, L., "SMB 3 Transparent Failover for Hitachi NAS Platform 4000 Series", Tech Note, Hitachi Data Systems, (Nov. 2016).
Cano, I. et al., "Curator: Self-Managing Storage for Enterprise Clusters", 14th USENIX Symposium on Networked Systems Design and Implementation, NSDI '17, (Mar. 27, 2017).
Poitras, Steven. "TheNutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Notice of Allowance dated Nov. 4, 2020 for related U.S. Appl. No. 15/160,347.
Mizrak, A. T. et al., "VMware vCenter Server High Availability Performance and Best Practices", VMware vCenter Server 6.5, Performance Study, VMware, (Nov. 2016).
VMware, "vSAN Planning and Deployment", VMware vSphere 7.0, VMware vSAN 7.0, VMware, Inc., (Apr. 2, 2020).
VMware, "VMware Infrastructure, Automating High Availability (HA) Services with VMware HA", VMware Technical Note, (Revised on Jun. 5, 2006).
VMware, "VMware® High Availability (VMware HA): Deployment Best Practices", VMware® vSphere™ 4.1, Technical White Paper, (Dec. 10, 2010), date retrieved from google.
Potheri, M. et al., "VMware vCenter Server™ 6.0, Availability Guide", Technical Marketing Documentation, Version 1.0, (May 2015).
McCarty, J., "VMware® Virtual SAN™ Stretched Cluster: Bandwidth Sizing Guidance", Technical White Paper, VMware, (Jan. 26, 2016), date retrieved from google.
McCarty, J., "VMware® Virtual SAN™ 6.1 Stretched Cluster & 2 Node Guide", Storage and Availability Business Unit, VMware, v 6.1.0c, version 0.20, (Jan. 2016).
Hogan, C., "VMware Virtual SAN Health Check Guide", Storage and Availability Business Unit, VMware, v 6.1.0, (Sep. 2015).

(56) References Cited

OTHER PUBLICATIONS

Dell: "High Availability and Data Protection With Dell EMC Isilon Scale-Out NAS", (Jul. 2018), Dell Inc.
Jcosta et al., "High Availability Setup Using Veritas Cluster Server and NetApp Synchronous SnapMirror—One button Failover-Failback with SnapMirror Sync and Veritas Cluster Server", (Nov. 18, 2010), NetApp Community.
NetApp: "Preparing storage systems for SnapMirror replication", (Jul. 2015), NetApp, Inc.
Bounds, J., "High-Availability (HA) Pair Controller Configuration Overview and Best Practices", (Feb. 2016), NetApp, Inc.
NetApp, "Clustered Data ONTAP 8.2 File Access Management Guide for CIFS", NetApp, Inc., (Feb. 2014).
Jung, Y. et al. " Standard-based Virtual Infrastructure Resource Management for Distributed and Heterogeneous Servers", ICACT, (Feb. 15, 2009).
Dell EMC, "Dell EMC Isilon OneFS Operating System, Scale-out NAS to maximize the data capital and business value of your unstructured data", Data Sheet, (Jan. 31, 2019), date retrieved from google.
Dell EMC, "Dell EMC Isilon OneFS Operating System, Powering the Isilon Scale-Out Storage Platform", White Paper, (Dec. 2019).
EMC, "EMC Isilon OneFS Operating System, Powering scale-out storage for the new world of Big Data in the enterprise", Data Sheet, (Apr. 2013).
EMC, Isilon OneFS, Version 8.0.1, Web Administration Guide, EMC Corporation, (Oct. 2016).
NetApp, "Enabling or disabling SMB automatic node referrals", ONTAP 9 Documentation Center, NetApp, Inc., (Updated Dec. 2020), from https://docs.netapp.com/ontap-9/index.jsp?topic=%2Fcom.netapp.doc.cdot-famg-cifs%2FGUID-AC7E8515-3A4C-4BB5-A8C8-38B565C952E0.html.
NetApp, "Guaranteeing throughput with QoS", ONTAP 9 Documentation Center, NetApp, Inc., (Updated Dec. 2020), from https://docs.netapp.com/ontap-9/index.jsp?topic=%2Fcom.netapp.doc.pow-perf-mon%2FGUID-77DF9BAF-4ED7-43F6-AECE-95DFB0680D2F.html.
NetApp. "How to troubleshoot the 'Autolocation' feature in Clustered Data ONTAP", Knowledgebase, NetApp, (Jun. 4, 2019).
NetApp. "How to troubleshoot the 'Autolocation' feature in Clustered Data ONTAP—Results", Knowledgebase, NetApp, (Captured on Sep. 19, 2019).
Cloudian, "Hybrid Cloud Storage with Cloudian HyperStore and Amazon S3", Solution Brief, Cloudian Inc., (Aug. 2015).
NetApp, "Improving client response time by providing SMB automatic node referrals with Auto Location", NetApp, Inc., (May 2013), from https://library.netapp.com/ecmdocs/ECMP1196891/html/GUID-0A5772A4-A6D7-4A00-AC2A-92B868C5B3B5.html.
NetApp, "Managing Workloads", ONTAP 9 Documentation Center, NetApp, Inc., (Updated Dec. 2020), from https://docs.netapp.com/ontap9/index.jsp?topic=%2Fcom.netapp.doc.pow-perf-mon%2FGUID-13D35FC5-AF37-4BBD-8A8E-B10B41451A16.html.
Nutanix, "Nutanix AFS—Introduction & Steps For Setting Up", (Jan. 3, 2018), from https://virtual building blocks. com/2018/01/03/nutanix-afs-introduction-steps-for-setting-up/.
NetApp, "Protect Your Data with NetApp Element Software", Solution Brief, NetApp, (Oct. 11, 2020), date retrieved from google.
Kemp, E., "NetApp SolidFire SnapMirror Architecture and Configuration", Technical Report, NetApp, (Dec. 2017).
Kleyman, B., "How Cloud Computing Changes Storage Tiering", DataCenter Knowledge, (Nov. 12, 2015).
Poitras, Steven. "The Nutanix Bible" (Aug. 1, 2020), from https://nutanixbible.com/ (Publication date based on indicated capture date by Archive.org; first publication date unknown).
VirtuAdmin, "Configure vCenter High Availability", Virtubytes, (Sep. 14, 2017).
U.S. Appl. No. 17/129,425 titled "Parallel Change File Tracking in a Distributed File Server Virtual Machine (FSVM) Architecture" filed Dec. 21, 2020.
U.S. Appl. No. 16/942,929 titled "Method Using Access Information in a Distributed File Server Virtual Machine (FSVM) Architecture, Including Web Access"; filed Jul. 30, 2020.
U.S. Appl. No. 16/944,323 titled "Actions Based on File Tagging in a Distributed File Server Virtual Machine (FSVM) Environment", filed Jul. 31, 2020.
U.S. Appl. No. 17/091,758 titled "Virtualized File Server Distribution Across Clusters", filed Nov. 6, 2020.
Non-Final Office Action dated Sep. 30, 2020 for related U.S. Appl. No. 16/177,126.
Notice of Allowance dated Mar. 10, 2021 for related U.S. Appl. No. 15/160,347.
EMC, "Using Vplex Metro and Recoverpoint With VMware SRM in an Oracle Extended RAC E-Business Suite Environment", White Paper, (Jul. 2013).
Deschner, G et al., "Calling the Witness: SMB3 Failover with Samba/CTDB", Redhat, (Oct. 2, 2015).
VMware, "VMware Horizon 6 with App Volumes and Virtual SAN Reference Architecture", Technical White Paper, VMware, (Apr. 9, 2011), date retrieved from google.
Feroce, D., "Leveraging VMware vSAN™ for Highly Available Management Clusters", Version 2.9, VMware, (Jan. 2018).
VMware, "Deployment for Multiple Availability Zones", VMware Validated Design for Software-Defined Data Center 4.3, VMware, (Jul. 17, 2018).
Banerjee, A. et al., "VMware Virtual SAN™ Stretched Cluster: Performance and Best Practices", Technical White Paper, VMware, (Oct. 22, 2015).
Hosken, M., "VMware vSAN™ Two-Node Architecture VMware Cloud Provider™ Use Cases", Version 2.9, VMware, (Jan. 2018).
"VMware Virtual SAN 6.2", Licensing Guide, VMware, (Revised Jun. 2016).
Hunter, J., "VMware Virtual SAN 6.2", PCI DSS Compliance Guide, (Revised Feb. 2016).
"VMware Virtual SAN: SAP Applications", Solution Overview, VMware, (May 6, 2016).
Eckerle, A. et al., "What's New in VMware vSphere® 6.5", Technical White Paper, (Nov. 15, 2016).
Notice of Allowance dated Aug. 4, 2021 for related U.S. Appl. No. 15/160,347.
Non-Final Office Action dated Aug. 5, 2021 for related U.S. Appl. No. 16/747,272.
Non-Final Office Action dated Sep. 7, 2021 for U.S. Appl. No. 16/947,444.

\* cited by examiner

TWO NODE CLUSTERS RECOVERY ON A FAILURE

FIELD

This disclosure relates to high availability computing systems, and more particularly to techniques for leadership election for recovery in two-node clusters.

BACKGROUND

Modern computing environments comprise distributed resources (e.g., compute facilities, data storage facilities, networking facilities, etc.) that are accessed by virtualized entities (e.g., virtual machines, executable containers, etc.) to perform various tasks. The foregoing resources of such distributed virtualization environments are managed by physical hardware units known as "nodes". As an example, a computing node in a high-availability computing setting might correspond to a physical computing appliance having one or more CPUs, multiple solid state drives (SSDs), multiple hard disk drives (HDDs), and multiple network connection interfaces (e.g., for 1 GbE connections, for 10 GbE connections, etc.). Two or more of such computing nodes are often organized in clusters to facilitate ongoing system management (e.g., control, coordination, scaling, etc.). The size or scale of a particular cluster is often quantified by the number of nodes in a particular cluster. A large cluster, for example, might support over one hundred nodes that in turn support as many as several thousands (or more) autonomous virtualized entities (VEs).

Users of such clusters have a high expectation of consistency and availability pertaining to the VEs and/or the data associated with the clusters. As such, an efficient and reliable disaster recovery (DR) capability is desired by users in modern distributed virtualization environments. Such DR capabilities might be facilitated by implementing various data replication functions (e.g., snapshotting, cloning, deduplication, etc.) in a cluster to support certain DR operations and/or scenarios. Specifically, a particular replication policy that describes a replication factor (RF), such as "RF=4", might be implemented in a cluster to ensure that four replicas of any changed data (e.g., metadata, user data, etc.) is distributed among various storage devices of the cluster to facilitate failover operations in case of some sort of a failure. Specifically, if a node in the cluster fails, the replicated data can be accessed by another available node in the cluster and failover can be accomplished. In some scenarios, DR capabilities implemented in the cluster might enable failback as well. For example, VEs and/or data from a failed node that had been the subject of a DR failover can be restored back to the same node when the failure event or events that precipitated the failover have been remediated.

Unfortunately, implementing such DR capabilities in a cluster that comprises only two nodes can present challenges. Specifically, DR capabilities are often managed at least in part by a leader node that is selected from a plurality of nodes of the cluster. However, in two-node computing clusters, situations can arise in which a leader needs to be elected. For example, if communication between the two nodes fails, each node may consider the other node a failed node and request to become leader so as to invoke certain DR operations (e.g., halt storage input/output operations, etc.) in response to the failure. When there is no other node available in the cluster to process leadership requests, all further operations at the cluster might be suspended until some human intervention is taken to address the failure. In such cases, not only are the users' expectations of high availability and consistency for the cluster jeopardized, but human intervention is also likely required to remedy the failures. What is needed is a technological solution for implementing disaster recovery, including leader selection in two-node computing clusters.

SUMMARY

The present disclosure describes techniques used in systems, methods, and in computer program products for systems and methods for disaster recovery of two-node computing clusters, which techniques advance the relevant technologies to address technological issues with legacy approaches. Certain embodiments are directed to technological solutions for implementing a leader selection protocol in a disaster recovery framework for two-node computing clusters.

The disclosed embodiments modify and improve over legacy approaches. In particular, the herein-disclosed techniques provide technical solutions that address the technical problems attendant to implementing disaster recovery capabilities in two-node computing clusters. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of computing cluster management as well as advances in various technical fields related to distributed storage systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
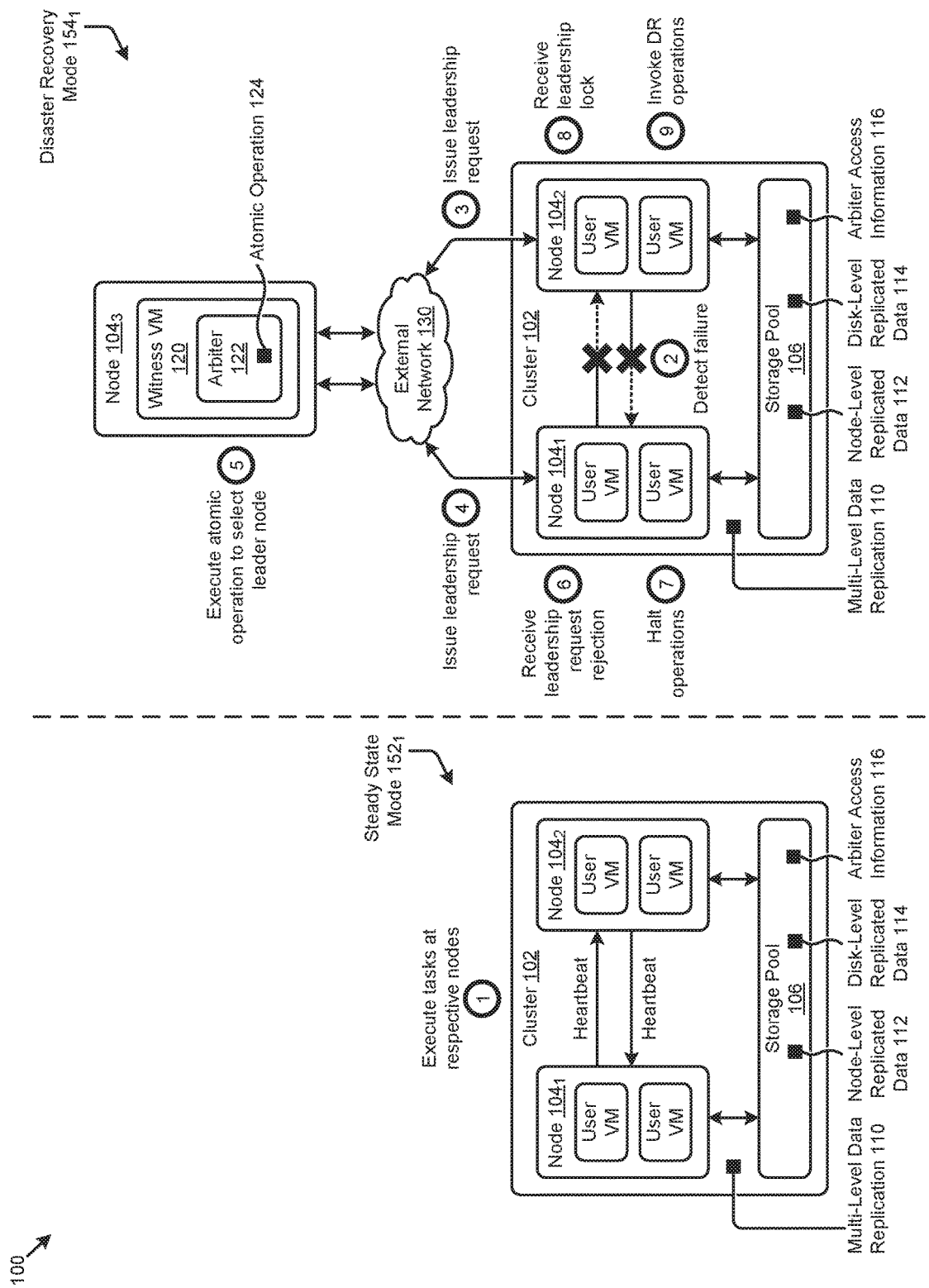
FIG. 1 illustrates a computing environment in which embodiments of the present disclosure can be implemented.

Embodiments in accordance with the present disclosure address the problem of implementing disaster recovery capabilities in two-node computing clusters. Some embodiments are directed to approaches for implementing a leader selection protocol for two-node computing clusters. The accompanying figures and discussions herein present example environments, systems, methods, and computer program products for disaster recovery of two-node computing clusters.

Overview

Disclosed herein are techniques for implementing a disaster recovery framework in a two-node cluster. The framework comprises a protocol for on-demand creation of an arbiter to facilitate leader selection and other DR operations in the event of some failure event. In certain embodiments, the nodes in the two-node cluster are configured in accordance with a set of disaster recovery configurations. For example, each node might be configured to comprise multiple physical storage facilities so as to facilitate a certain node-level and/or disk-level replication factor (e.g., RF=4) over the two nodes. A different cluster (e.g., a remote cluster) is capable of hosting an arbiter. The operations of such an arbiter are relatively simple and require relatively little CPU capacity, and thus, the capabilities of such an arbiter can be shared by many clusters (e.g., tens or hundreds of clusters or more). An access technique (e.g., a web service, an IP address, etc.) to communicate with the node of the cluster that hosts the arbiter is registered with the nodes of the two-node cluster. An in-memory copy of the registered access technique is maintained by each node of the two-node cluster. In the event of some failure being detected by one or both of the two nodes of the two-node cluster, the remote cluster can be accessed via the registered access technique to avail the services of the arbiter.

For detection of various types of failures, the two nodes of the two-node cluster monitor each other via periodic heartbeat indications. When a failure associated with one or both nodes is detected, the arbiter is accessed by any of the nodes that are then capable of accessing the arbiter. In cases where communication between the two nodes fails (e.g., a heartbeat is missed for more than one period) but the nodes are still functional, both nodes might access the arbiter. In other cases (e.g., when one node fails), merely one of the nodes might access the arbiter.

In any of the foregoing cases, upon detecting the failure, one or both nodes cease operations to the storage pool, and one or both nodes invoke a protocol to communicate with a witness node that hosts the aforementioned arbiter. The witness facilitates establishment of a single leader node even in the case that both nodes request leadership. In a two-node cluster, a quorum needed to elect a leader can be formed by one of the two nodes of the two-node cluster plus the witness. More specifically, the witness node in combination with at least one of the two nodes of the two-node cluster serves to form the quorum needed for the witness to vote with the at least one of the two nodes of the two-node cluster, while the other node of the two-node cluster is not elected to be the leader.

Responsive to the single leader node being selected, various disaster recovery operations are performed at the operational nodes of the cluster. For example, a node that is not the leader node might immediately halt operations, while a node that is selected as the leader node completes replication operations. The node that is selected as the leader node might initiate a failover (e.g., using replicated data) of the VEs at a failed node. In certain embodiments, the witness is created on demand upon request by a node of the two-node cluster. Such an on-demand arbiter is stopped and gracefully destroyed when the formation of the quorum has served its purpose (e.g., when leader selection protocol operations are completed).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to implementing a leader selection protocol in a disaster recovery framework for two-node computing clusters. Specifically, the figure presents a logical depiction of how the herein disclosed techniques can be implemented in a computing environment to display various system metrics associated with the computing environment to facility disaster recover capabilities in two-node computing clusters.

Referring to a steady state mode $152_1$, the logical depiction of FIG. 1 illustrates a cluster 102 that comprises two computing nodes (e.g., node $104_1$ and node $104_2$). A two-node cluster might be implemented as the sole computing facility of a small enterprise, or as a special computing facility (e.g., for a remote office or branch office) of a larger enterprise that has other computing clusters. The nodes of cluster 102 can comprise various virtualized entities or VEs (e.g., user virtual machines or user VMs, virtualized disks or vDisks, virtualized network interface cards or vNICs, executable containers, etc.) that are implemented to execute certain tasks (operation 1) when in steady state mode $152_1$ (e.g., normal operation without failure).

To facilitate the implementation of the user VMs and/or execution of the tasks, the nodes access a storage pool 106. The storage pool 106 can comprise storage facilities (e.g., SSDs, HDDs, etc.) local to the nodes and, in some cases, storage facilities (e.g., networked storage) external to the nodes and/or cluster 102. The storage facilities at the storage pool 106 store metadata (e.g., configuration specifications, state information, etc.) associated with the virtualized entities, user data (e.g., files, pictures, videos, etc.) managed by the virtualized entities, and/or other information. In this and other embodiments, the storage pool is a collection of a plurality of storage devices that includes both local storage (e.g., using node-internal storage devices) and any forms of network-accessible storage that are organized to form a contiguous address space that is shared by two or more nodes.

As shown in steady state mode $152_1$, node $104_1$ and node $104_2$ might monitor one another by sending "heartbeat" signals from time to time (e.g., every two seconds) that indicate the node sending the signal is operating as expected.

As earlier mentioned and as shown in steady state mode $152_1$, users of computing clusters, including two-node computing clusters (e.g., cluster 102), often have a high expectation of consistency and availability pertaining to the VEs and/or the data associated with the clusters. As such, an efficient and reliable disaster recovery (DR) capability is desired. However, implementing such DR capabilities in a cluster that comprises only two nodes can present challenges. The herein disclosed techniques address such challenges by implementing a disaster recovery framework in the two-node cluster.

As indicated in FIG. 1, the disaster recovery framework at least in part comprises techniques for multi-level data replication 110 at cluster 102. Multi-level data replication is a type of data replication that is performed over various levels (e.g., a node level, a disk level, etc.) of hierarchically related physical components. For example, a node-level data replication will generate and store an instance of node-level replicated data 112 at each node in cluster 102. A node-level data replication might be implemented to replicate the user data of cluster 102 according a node-level replication factor of two (e.g., RF=2) so as to facilitate certain disaster recovery operations at the cluster. As another example, a disk-level data replication will generate and store instances of disk-level replicated data 114 at selected "disks" (e.g., SSDs, HDDs, etc.) associated with the nodes of cluster 102. A disk-level data replication might be implemented to replicate the VE metadata of cluster 102 according to a disk-level replication factor of four (e.g., RF=4) to facilitate certain disaster recovery operations at the cluster.

The aforementioned disaster recovery framework further comprises a protocol for accessing an arbiter to facilitate selection of a leader node that in turn performs DR operations in the event of a failure at the two-node cluster. As such, certain arbiter access information 116 (e.g., is made available by a registration process) to node $104_1$ and node $104_2$ of cluster 102. As can be observed, an arbiter 122 might be a service managed by a virtual machine (e.g., witness VM 120) operating at a node $104_3$. In this case, the arbiter access information 116 might comprise a URI or IP address of the witness VM 120, a username and password for access authentication, and/or other information for accessing the arbiter 122. As shown, node $104_3$ as well as the hosted witness VM and its arbiter instance are external to cluster 102. A particular witness VM and arbiter might serve multiple (e.g., 50, 500, 5000, etc.) instances of computing clusters. In some embodiments, the witness VM is accessible via the Internet. The witness VM and its arbiter service can be hosted in a different cluster that is geographically proximal or geographically distal from cluster 102.

Referring to a disaster recovery mode $154_1$ of FIG. 1, when a failure associated with one or both nodes of cluster 102 is detected, the arbiter 122 is accessed by any of the nodes that are then capable of accessing the arbiter. For example, node $104_1$ and node $104_2$ might both detect a failure (operation 2) in response to a heartbeat signal not being received at either node after a certain period of time (e.g., 10 seconds or five consecutive unsuccessful heartbeat pings). This situation might occur when the intra-cluster communication between nodes of cluster 102 has failed. In this case, node $104_1$ and node $104_2$ will invoke the protocol with the arbiter 122 by issuing a respective leadership request over an external network 130 (e.g., the Internet) to the arbiter 122 (operation 3 and operation 4). In other cases (e.g., one node fails), merely one of the nodes of cluster 102 might access the arbiter 122.

Upon receiving the one or more leadership requests, an atomic operation 124 is executed at arbiter 122 to select a leader node (operation 5). For example, a compare-and-swap operation and/or a semaphore might be implemented at arbiter 122 to select a single leader node in the presence of multiple contending leadership requests. In this case, the leader node is selected based at least in part on at least one outcome of at least one atomic leadership election operation (e.g., atomic operation 124) performed by arbiter 122. Using this approach, the selected leader node might be the node associated with the first received leadership request. The node that is not selected as leader (e.g., node $104_1$) then receives a leadership request rejection (operation 6) and halts operations (operation 7) to, for example, avoid data access (e.g., write) conflicts at storage pool 106. In some cases, the node not selected as leader might receive no response, which lack of response serves to indicate that the node was not selected as the leader node.

The selected leader node (e.g., node $104_2$) receives an indication of a leadership lock (e.g., leadership request confirmation) (operation 8) which can, for example, enable the leader node to invoke certain DR operations (operation 9). Examples of such DR operations include node operating mode transition operations (e.g., from a steady state mode to a single-node mode), failover operations (e.g., into a failover configuration at the remote cluster or into a failover configuration within the two-node cluster), and failback operations (e.g., into a failback configuration within the two-node cluster). As used herein, a failback configuration is one where at least the same number of nodes of the cluster are again operational after a failover operation. More specifically, a failback configuration is one where the two nodes of the cluster are again operational after one of the two nodes triggered a failover operation.

The disaster recovery capabilities facilitated by the herein disclosed techniques result in improvements in computer functionality that serve to reduce the demand for computer processing power, reduce the demand for computer memory and data storage, reduce network bandwidth use, and reduce the demand for inter-component communication, in two-node computing clusters. Specifically, by providing disaster recovery capabilities in computing clusters having merely two nodes, applications of the herein disclosed techniques satisfy the data consistency and availability expectations of users without requiring additional computing resources—such as additional nodes, each with compute, storage and networking facilities—that could be used to support such DR capabilities, but that might not be otherwise used (e.g., for tasks unrelated to DR).

One embodiment of techniques for arbiter-based disaster recovery is disclosed in further detail as follows.

Figure 2:
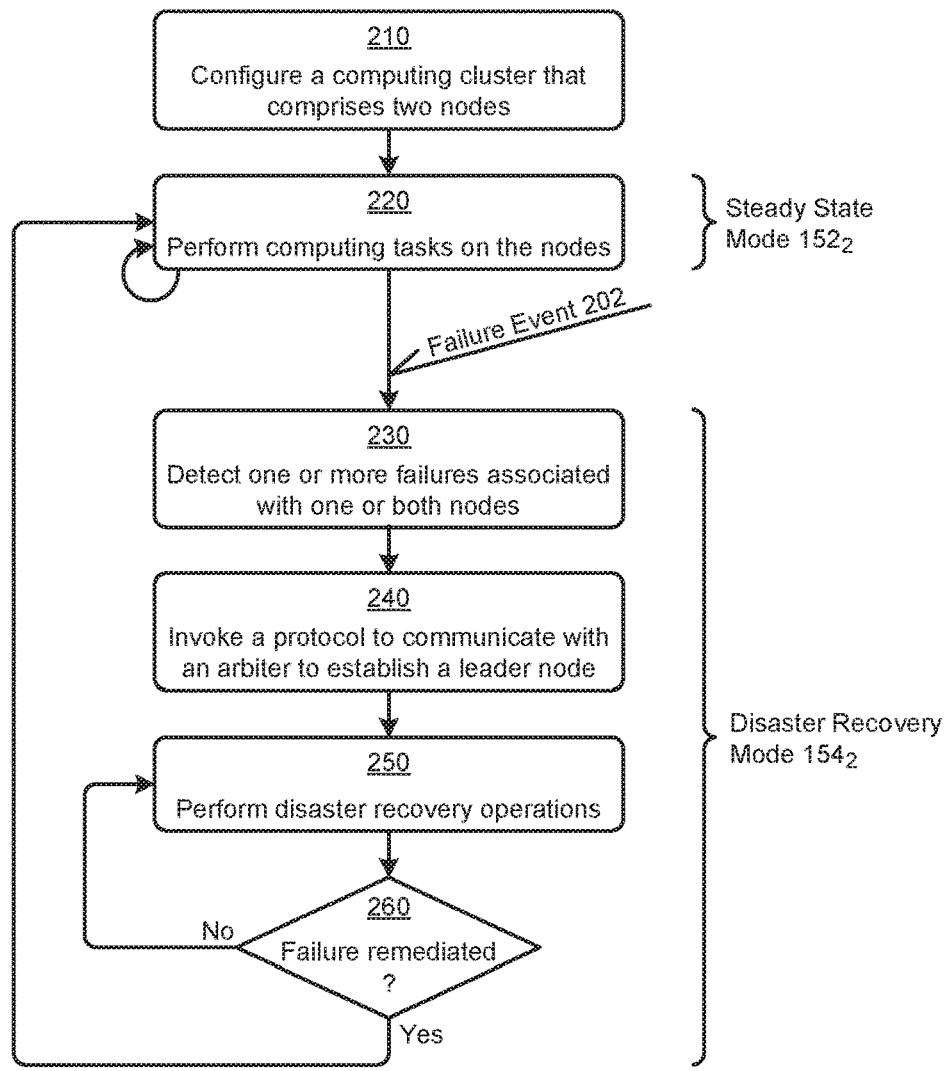
FIG. 2 depicts an arbiter-based disaster recovery technique as implemented in systems that facilitate disaster recovery of two-node computing clusters, according to an embodiment.

FIG. 2 depicts an arbiter-based disaster recovery technique 200 as implemented in systems that facilitate disaster recovery of two-node computing clusters. As an option, one or more variations of arbiter-based disaster recovery technique 200 or any aspect thereof may be implemented in the context of the architecture and functionality of the embodiments described herein. The arbiter-based disaster recovery technique 200 or any aspect thereof may be implemented in any environment.

FIG. 2 illustrates one aspect pertaining to implementing a leader selection protocol in a disaster recovery framework for two-node computing clusters. Specifically, the figure presents one embodiment of certain steps and/or operations that facilitate accessing an arbiter to select a single leader node from the nodes of a two-node cluster so as to perform various disaster recovery operations to remediate failures at the cluster. As shown, portions of the steps and/or operations can correspond to a steady state mode $152_2$ or a disaster recovery mode $154_2$.

The arbiter-based disaster recovery technique 200 can commence by configuring a computing cluster that comprises two nodes to operate in a distributed virtualized environment (step 210). The configuration of the nodes and/or cluster might specify certain parameters related to the DR capabilities and/or other aspects of the cluster, such as parameters pertaining to a node-level replication factor (e.g., RF=2), a disk-level replication factor (e.g., RF=4), a resource usage level (e.g., a maximum usage level of 40%), a recovery point objective (e.g., 6 hours), a network latency limit (e.g., 500 ms), a number of SSDs (e.g., two per node), and/or a number of HDDs (e.g., two per node). In steady state mode $152_2$, various computing tasks are continuously performed at virtualized entities operating at the nodes (step 220). Such computing tasks can include data replication tasks (e.g., in accordance with a data replication policy) to facilitate certain DR operations and/or other tasks.

Detecting one or more failures (e.g., failure event 202) associated with one or both nodes in the computing cluster can initiate the disaster recovery mode $154_2$ (step 230). For example, failure event 202 might be associated with a node failure, an intra-cluster communication failure, an external communication failure, an arbiter (or witness VM) access failure, and/or any other failure and/or combination thereof. In response to detecting the one or more failures, a protocol is invoked to communicate with the arbiter to establish (e.g., select) a leader node from one of the two nodes of the cluster (step 240). As earlier mentioned, an arbiter service managed by a witness VM might execute one or more atomic operations to select a leader node in the presence of multiple contending leadership requests from the nodes.

When the leader node is selected, various disaster recovery operations based at least in part on the detected failures are performed (step 250). The particular disaster recovery operations performed are selected, for example, based at least in part on the cluster and/or node configuration, the policies associated with the cluster and/or users of the cluster, the then-current state and/or operating mode of the nodes, and/or other information. Until the failure is remediated (see "No" path of decision 260), the disaster recovery operations (e.g., listening for recovery signal) will continue. When the failure is remediated (see "Yes" path of decision 260), the cluster returns the steady state mode $152_2$, where computing tasks are executed at the virtualized entities of the nodes.

One embodiment of a system for implementing the arbiter-based disaster recovery technique 200 and/or other herein disclosed techniques is disclosed as follows.

Figure 3:
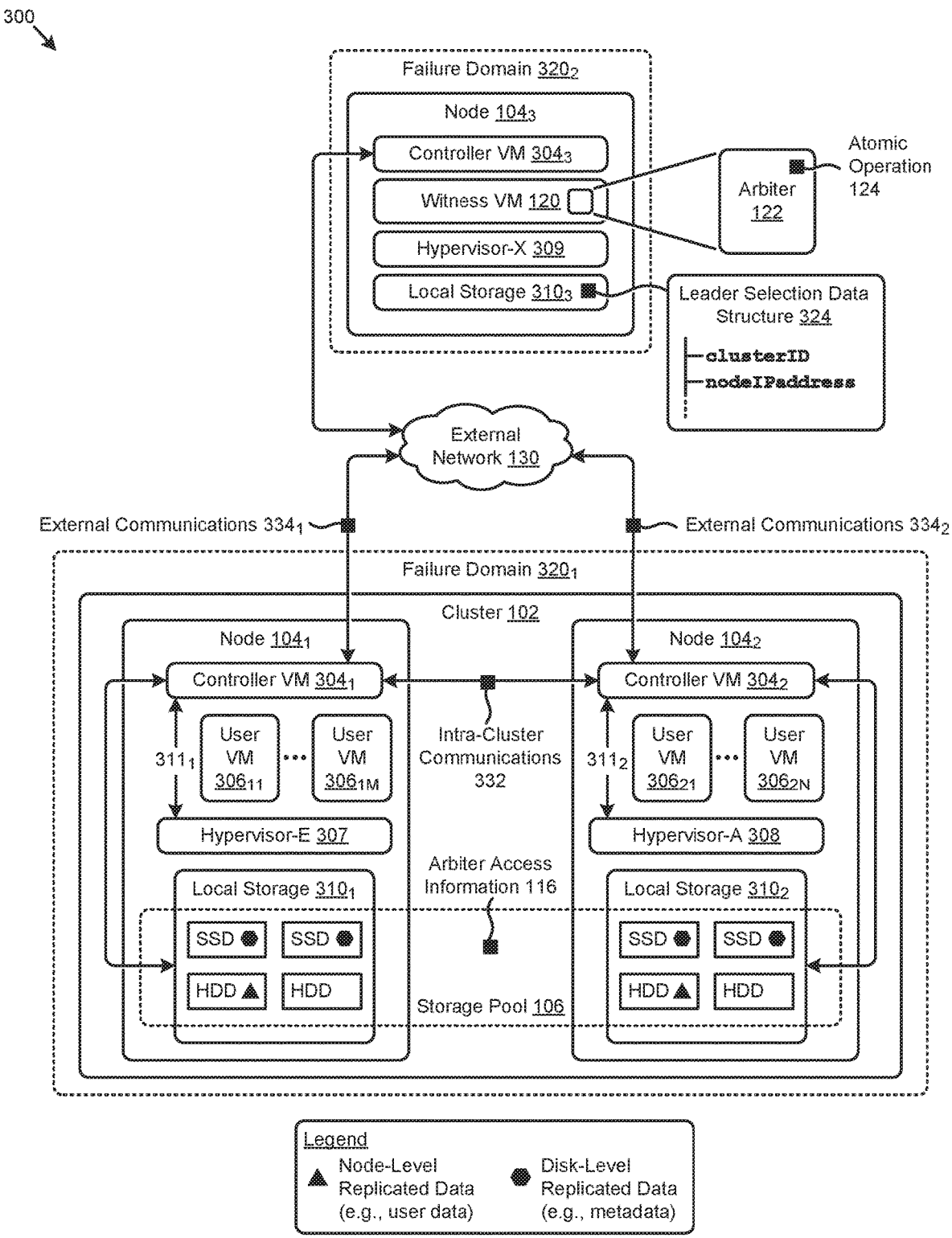
FIG. 3 presents a block diagram of a system for disaster recovery of two-node computing clusters, according to an embodiment.

FIG. 3 presents a block diagram of a system 300 for disaster recovery of two-node computing clusters. As an option, one or more variations of system 300 or any aspect thereof may be implemented in the context of the architecture and functionality of the embodiments described herein. The system 300 or any aspect thereof may be implemented in any environment.

FIG. 3 illustrates one aspect pertaining to implementing a leader selection protocol in a disaster recovery framework for two-node computing clusters. Specifically, the figure is being presented to show one embodiment of certain representative components and associated data flows that describe how the herein disclosed techniques might be implemented in a modern computing system. The components and data flows shown in FIG. 3 present one partitioning and associated data manipulation approach. The specific example shown is purely exemplary, and other subsystems, data structures, and/or partitioning are reasonable.

As shown in FIG. 3, the system 300 comprises a cluster 102 comprising two nodes (e.g., node $104_1$ and node $104_2$) that have multiple tiers of storage in a storage pool 106. Each node can be associated with one server, multiple servers, or portions of a server. The nodes can be associated (e.g., logically and/or physically) with the clusters. As shown, the multiple tiers of storage include instances of local storage (e.g., local storage $310_1$ and local storage $310_2$). For example, the local storage can be within or directly attached to a server and/or appliance associated with the nodes. Such local storage can include solid state drives (SSDs), hard disk drives (HDDs), and/or other storage devices. In some embodiments, the multiple tiers of storage can include storage that is accessible through an external network 130, such as a networked storage (e.g., a storage area network or SAN, network attached storage or NAS, etc.).

According to the disaster recovery framework of the herein disclosed techniques, various node-level replicated data (e.g., user data) and disk-level replicated data (e.g., metadata) are distributed over the storage pool 106 to facilitate certain disaster recovery operations. A node $104_3$ external to cluster 102 and having an associated instance of local storage $310_3$ is also shown in system 300. Furthermore, cluster 102 is associated with a failure domain $320_1$ whereas node $104_3$ is associated with a failure domain $320_2$. As used herein, a failure domain or availability domain is a logical collection of hardware components (e.g., nodes, switches, racks, etc.) that are affected by failures within the collection. As an example, a failure domain might comprise a single physical node appliance or a rack of node appliances. The separate failure domains of cluster 102 and node $104_3$ indicate that a failure endemic to cluster 102 will not affect node $104_3$.

As shown, any of the nodes of system 300 can implement one or more virtualized entities, such as virtual machines (e.g., VM $306_{11}$, VM $306_{1M}$, VM $306_{21}$, ..., VM $306_{2N}$, witness VM 120) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system, while the VMs run multiple applications on various respective guest operating systems. Such flexibility can be facilitated at least in part by one of a variety of heterogeneous hypervisors (e.g., hypervisor-E 307, hypervisor-A 308, or hypervisor-X 309), which hypervisors are logically located between the various guest operating systems of the VMs and the host operating system of the physical infrastructure (e.g., the nodes). Any controller VM can communicate with any hypervisor of any hypervisor type over a respective hypervisor-agnostic communication channel (e.g., hypervisor-agnostic communication channel $311_1$, hypervisor-agnostic communication channel $311_2$). Such a hypervisor-agnostic communication channel can be used to facilitate halting of a VM and/or for invoking other DR operations. As used herein, a hypervisor-agnostic communication channel is a mechanism whereby a controller VM can issue a generic command (e.g., "halt") that is translated into a hypervisor-specific command. The communication channel can operate by invocation of a hypervisor-specific call interface such as an application programming interface, and/or can operate over a packet switching network.

As an alternative to and/or in addition to VMs being implemented in the nodes, executable containers may be implemented in the nodes. The executable containers comprise groups of processes and/or resources (e.g., memory, CPU, disk, etc.) that are isolated from the node host computer and/or other containers. Such executable containers directly interface with the kernel of the host operating system without, in most cases, a hypervisor layer. This lightweight implementation can facilitate efficient distribution of certain software components, such as applications or services (e.g., micro-services). Any node of system 300 can implement both a hypervisor-assisted virtualization environment and a container virtualization environment for various purposes.

Furthermore, any node in system 300 can implement a virtualized controller to facilitate, at least in part, access to storage facilities (e.g., storage pool 106, local storage $310_3$, networked storage, etc.) by the VMs and/or the executable containers operating at the node. As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a layer in a hypervisor). As can be observed in system 300, an instance of a virtual machine (e.g., controller VM $304_1$, controller VM $304_2$, and controller VM $304_3$) at each node is used as a virtualized controller to, at least in part, manage storage and I/O (input/output or IO) activities at the node. Controller VM $304_1$ of node $104_1$ and controller VM $304_2$ of node $104_2$ also facilitate the intra-cluster communications 332 (e.g., heartbeat signaling).

Furthermore, the controller VMs of the nodes in system 300 interact using external communications (e.g., external communications $334_1$ and external communications $334_2$) over external network 130. For example, such external communications might be used to issue leadership requests from the nodes of cluster 102 to an arbiter 122 managed by witness VM 120 operating at node $104_3$, and receive leadership request responses (e.g., a leadership lock) issued from arbiter 122 to node $104_1$ and/or node $104_2$ of cluster 102.

The virtualized entities at the nodes of system 300 can interface with the controller VM of the node through a respective hypervisor. In such cases, the controller VM is not formed as part of specific implementations of a given hypervisor. Instead, the controller VM can run as a virtual machine above the hypervisor at the various nodes. When the controller VMs run above the hypervisors, varying virtual machine architectures and/or hypervisors can operate with the system 300. For example, a hypervisor (e.g., hypervisor-E 307) at one node might correspond to software from a first vendor (e.g., VMware), and a hypervisor (e.g., hypervisor-A 308) at another node might correspond to a second software vendor (e.g., Nutanix). As another virtualized controller implementation example, executable containers (e.g., Docker containers) can be used to implement a virtualized controller in an operating system virtualization environment at a given node. In this case, for example, the virtualized entities at a particular node can interface with a controller container through a hypervisor and/or the kernel of the host operating system of the node.

As earlier mentioned, arbiter 122 can be implemented in witness VM 120 operating at node $104_3$. The arbiter can comprise a set of programming objects and/or instructions that collectively (e.g., as a service, web service, micro-service, etc.) provide certain functionality to facilitate the herein disclosed techniques. Specifically, for example, the arbiter 122 might execute one or more atomic operations (e.g., atomic operation 124) to select a leader node in the presence of multiple leadership requests. Such leadership requests might be issued by node $104_1$ and/or node $104_2$ of cluster 102 in response to a failure (e.g., failure of intra-cluster communications 332) detected at the cluster. Access to the arbiter 122 by the nodes of cluster 102 might be facilitated by arbiter access information 116 (e.g., IP address, username and password, etc.) stored at storage pool 106. As can be observed, certain information stored in local storage $310_3$ in accordance with a leader selection data structure 324 can be accessed by arbiter 122 to select and/or identify the leader node. For example, the arbiter might perform a compare-and-swap operation on the string value in a "nodeIPaddress" field to set the value to the IP address of the selected leader node. More specifically, the value will be set if and only if the "nodeIPaddress" field is empty. The string value set in the "nodeIPaddress" field and/or other information (e.g., a cluster identifier stored in a "clusterID" field) can be used to issue a leadership lock to a node uniquely identified by the combination of "nodeIPaddress" and "clusterID".

The foregoing discussions include techniques for invoking a protocol to communicate with the arbiter 122 to establish a leader node (e.g., step 240 of FIG. 2), which techniques are disclosed in further detail as follows.

Figure 4:
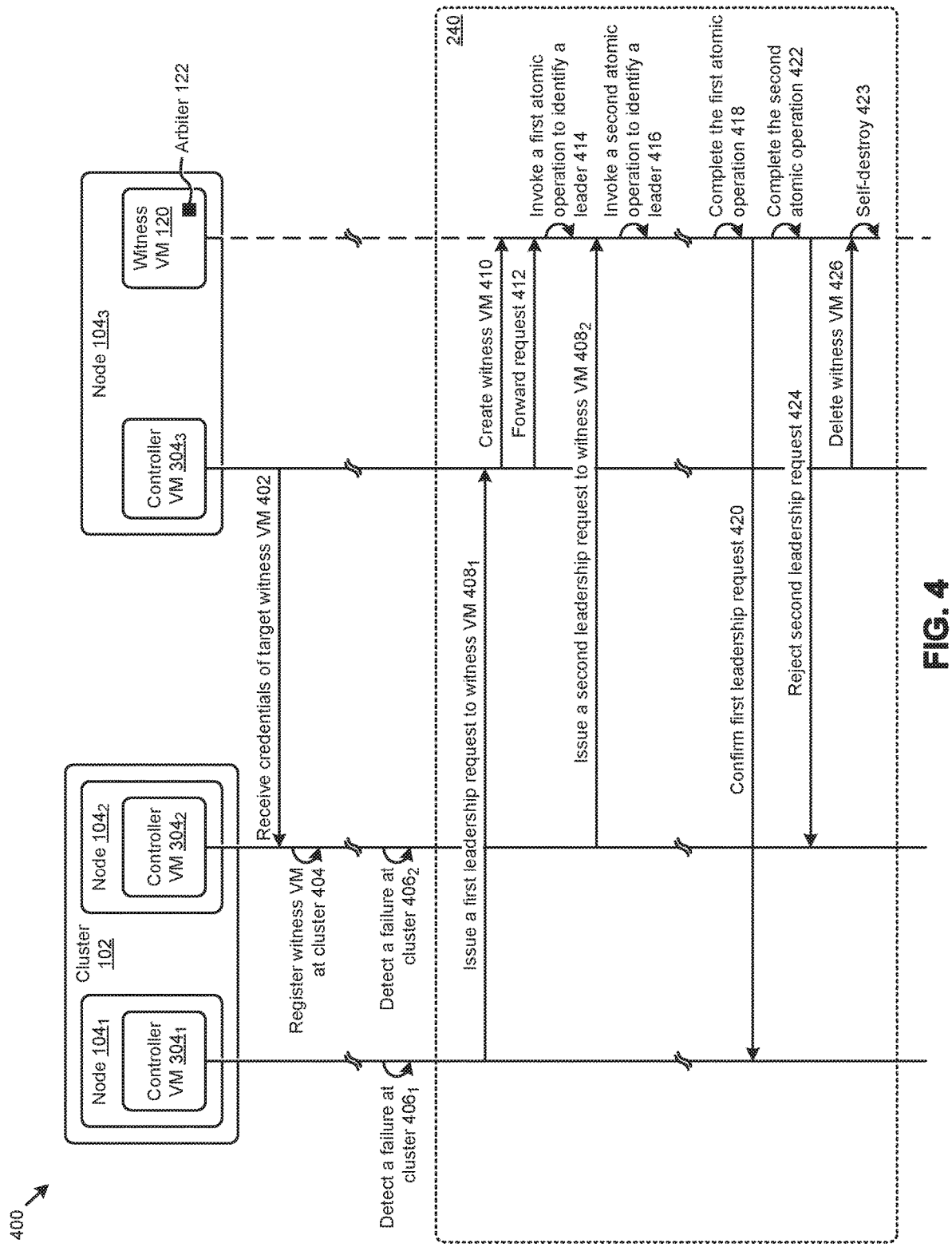
FIG. 4 presents a leader selection protocol as implemented in systems that facilitate disaster recovery of two-node computing clusters, according to an embodiment.

FIG. 4 presents a leader selection protocol 400 as implemented in systems that facilitate disaster recovery of two-node computing clusters. As an option, one or more variations of leader selection protocol 400 or any aspect thereof may be implemented in the context of the architecture and functionality of the embodiments described herein. The leader selection protocol 400 or any aspect thereof may be implemented in any environment.

FIG. 4 illustrates one aspect pertaining to implementing a leader selection protocol in a disaster recovery framework for two-node computing clusters. Specifically, the figure is being presented to depict a set of high order interactions (e.g., operations, messages, etc.) exhibited by various computing components earlier described that in part comprise one embodiment of a protocol for selecting a leader node from the nodes of a two-node cluster. The particular computing components shown in FIG. 4 are the controller VMs (e.g., controller VM $304_1$ and controller VM $304_2$) of the two nodes (e.g., node $104_1$ and node $104_2$) of cluster 102, and the controller VM $304_3$ associated with the witness VM 120 of node $104_3$. The arbiter 122 earlier mentioned is shown as being managed at witness VM 120. As also shown, a portion of the interactions of leader selection protocol 400 correspond to step 240 as discussed pertaining to FIG. 2.

The leader selection protocol 400 can commence with receiving the credentials (e.g., URL, IP address, access authorization and/or authentication credentials, etc.) of a target witness VM at cluster 102 (message 402). Any controller VM (e.g., controller VM $304_2$) associated with the nodes of the cluster can receive the credentials on behalf of the cluster. In some embodiments, as is shown in FIG. 4, the witness VM 120 is not created at the time the credentials are received at cluster 102. Rather, the target witness VM credentials are merely received from controller VM $304_3$ on behalf of witness VM 120. The received credentials and/or other information are stored to register the witness VM with the cluster for later use in requesting creation of a witness (operation 404).

At some later point in time, a failure is detected by one or both nodes at cluster 102 (operation $406_1$ and operation $406_2$). The controller VM $304_1$, for example, of node $104_1$ issues a first leadership request to the target witness VM which is intercepted at controller VM $304_3$ (message $408_1$). In response to receiving the first leadership request, the witness VM 120 is created (command message 410) and the request is forwarded to the witness VM 120 (message 412). Using the information (e.g., cluster identifier, node identifier, node IP address, etc.) received in the first leadership request, a first atomic operation to identify a leader node is invoked at arbiter 122 of witness VM 120 (operation 414). A second leadership request is also issued from controller VM $304_2$ of node $104_2$ (message $408_2$) which, in turn, invokes a second atomic operation at arbiter 122 of witness VM 120 (operation 416).

At a later moment in time, the first atomic operation invoked at arbiter 122 is completed (operation 418). For example, the outcome of the first atomic operation indicates that node $104_1$ is selected as the leader node. Due to the atomic nature of the selection operation at arbiter 122, node $104_1$ was selected without any conflict arising from the second leadership request issued from node $104_2$. As a result of the outcome of the first atomic operation, a confirmation of the first leadership request (e.g., a leadership lock) is issued to controller VM $304_1$ of node $104_1$ (message 420). The outcome resulting from completion of the second atomic operation executed at arbiter 122 (operation 422) precipitates an issuance of a rejection of the second leadership request to controller VM $304_2$ of node $104_2$ (message 424). In some cases, the witness VM 120 can be destroyed when a leader node is successfully selected (command message 426).

As such, the depicted protocol of FIG. 4, in particular the acts responsive to command message 410 and command message 426, serve to implement an ephemeral witness. An ephemeral witness is a process that is capable of performing atomic operations (e.g., using a semaphore or a compare and swap data value), which process is generated at the direction of another process (e.g., a controller VM). The ephemeral witness is able to self-destroy (operation 423) upon a command or message.

FIG. 5A, FIG. 5B, FIG. 5C, and FIG. 5D depict a set of disaster recovery scenarios as performed in systems that facilitate disaster recovery of two-node computing clusters. As an option, one or more variations of disaster recovery scenarios or any aspect thereof may be implemented in the context of the architecture and functionality of the embodiments described herein. The disaster recovery scenarios or any aspect thereof may be implemented in any environment.

FIG. 5A, FIG. 5B, FIG. 5C, and FIG. 5D illustrate one aspect pertaining to implementing a leader selection protocol in a disaster recovery framework for two-node computing clusters. Specifically, the figures are being presented to illustrate an embodiment of the herein disclosed techniques that facilitates the following scenarios pertaining to a two-node cluster: a steady state scenario 582, a node failure scenario 584, a remote cluster failover scenario 586, a remote cluster failback scenario 588, a node communication failure scenario 590, a node operating mode transition scenario 592, an intra-cluster failover scenario 594, and an intra-cluster failback scenario 596.

Figure 5A:
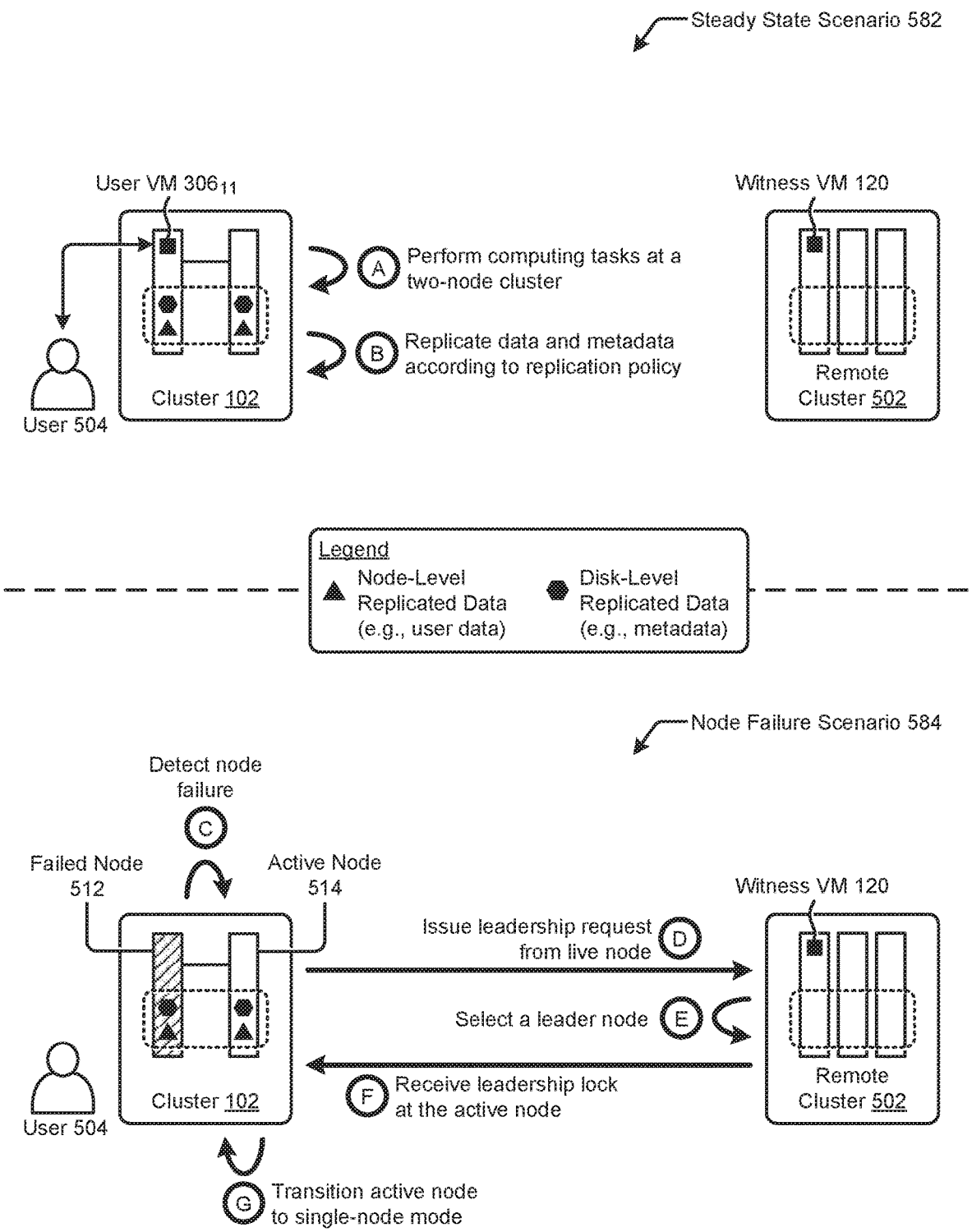
FIG. 5A, FIG. 5B, FIG. 5C, and FIG. 5D depict disaster recovery scenarios as performed in systems that facilitate disaster recovery of two-node computing clusters, according to an embodiment.

As shown in steady state scenario 582 of FIG. 5A, various computing tasks are performed at cluster 102, which is a two-node cluster (operation A). The data (e.g., user data, metadata, etc.) associated with cluster 102 are replicated according to one or more replication policies associated with the cluster (operation B). At least some of the replicated data pertains to a user VM $306_{11}$ running at a node of cluster 102 and operated by a user 504. As shown, a witness virtual machine 120 is implemented at remote cluster 502, however the witness could be implemented in any network-accessible computing system.

As shown in node failure scenario 584 of FIG. 5A, a failure is detected at cluster 102 (operation C). As can be observed, the failure in node failure scenario 584 pertains to a failed node 512. Access to any virtualized entities (e.g., user VM $306_{11}$) operating on failed node 512 is suspended. The active node 514 in cluster 102 issues a leadership request to the witness VM 120 in accordance with the herein disclosed techniques (operation D). The active node 514 is selected as the leader node (e.g., by an arbiter) by witness VM 120 (operation E) and a leadership lock is received at the active node 514 (operation F). The active node 514 transitions to a single-node mode (operation G). In the single-node mode, node-level replication is disabled, but disk-level replication over the storage facilities available at the active node 514 is maintained. If a sufficient number of storage facilities at the active node 514 is not achieved (e.g. within 60 seconds), the active node 514 may transition to a read-only mode in which data writes are suspended. For example, if one of two SSDs at active node 514 becomes unavailable while the active node is in single-node mode with a disk-level replication factor of two, the active node 514 will transition to a read-only mode until a second SSD becomes available.

Figure 5B:
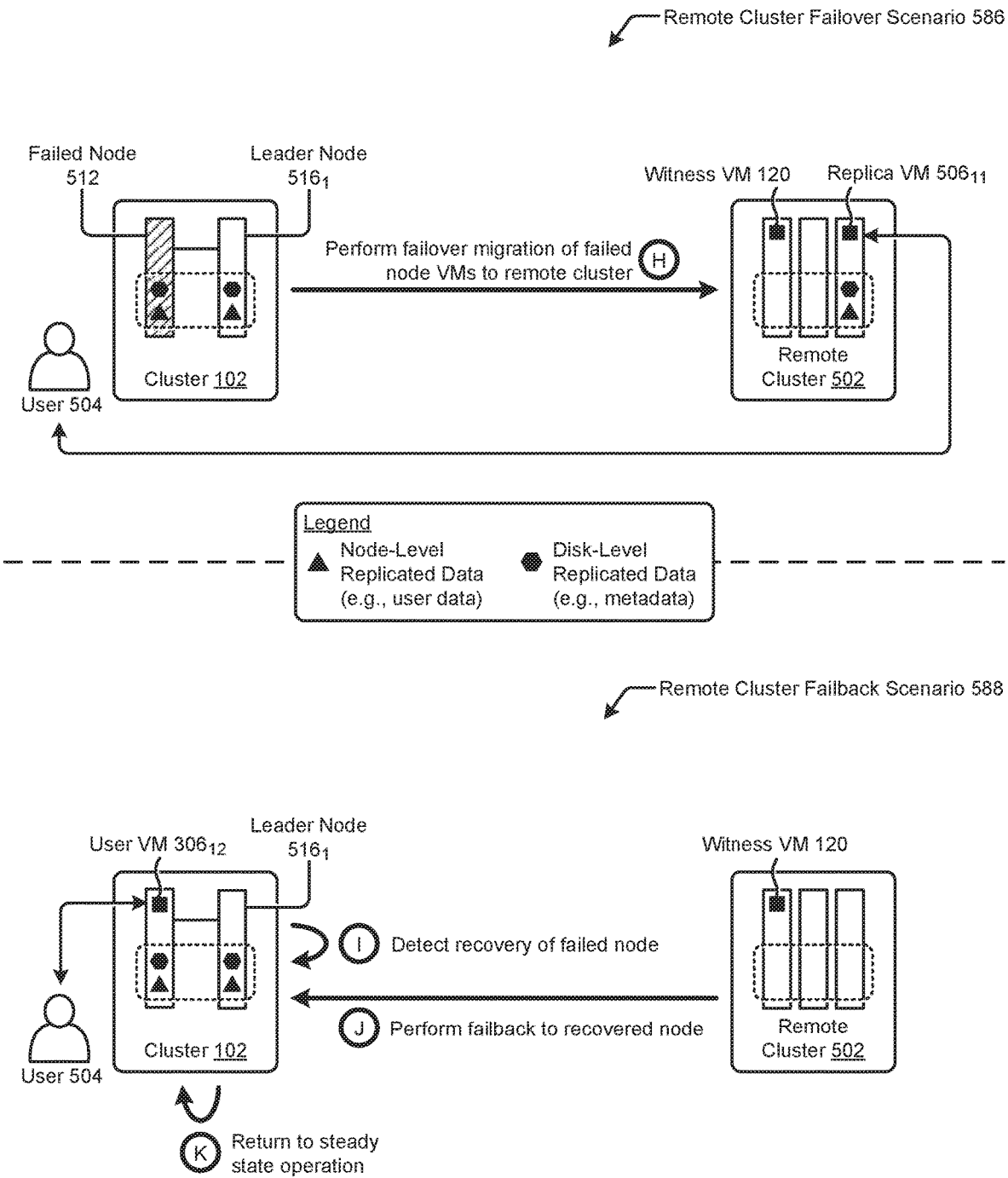

As shown in remote cluster failover scenario 586 of FIG. 5B, the then-current leader node (e.g., leader node $516_1$) as selected by witness VM 120 can invoke a failover migration of the virtualized entities (e.g., VMs) of the failed node 512 to the remote cluster 502 (operation H). For example, a failover migration of a VM hosted on failed node 512 might be performed to bring up a replica VM $506_{11}$ at the remote cluster 502 so that user 504 can continue working.

As shown in remote cluster failback scenario 588 of FIG. 5B, the recovery of the failed node might be detected (e.g., by leader node $516_1$) at some moment in time (operation I). With the earlier failure being remediated, a failback from the remote cluster 502 to the recovered node is performed (operation J) and the nodes in cluster 102 return to a steady state operation (operation K). As an example, user 504 can again access an instance of a VM (e.g., user VM $306_{12}$) operating at the earlier failed node of cluster 102.

Figure 5C:
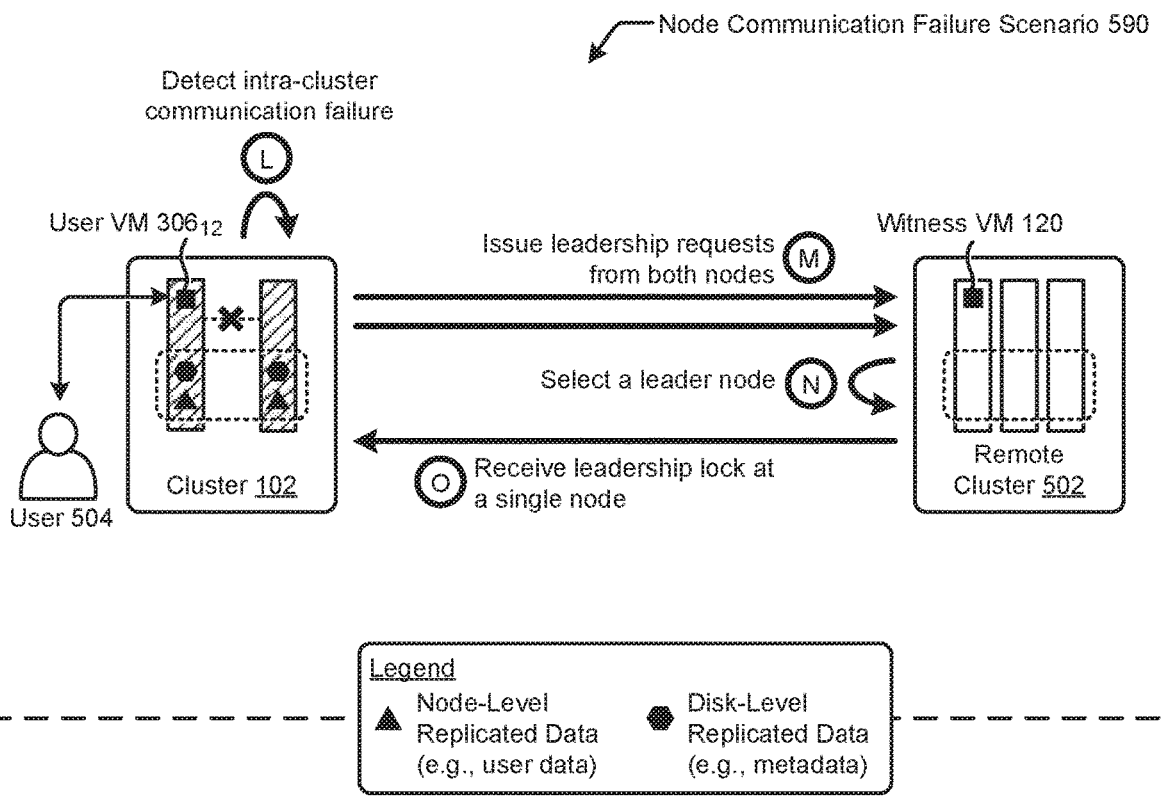
Figure 5C:
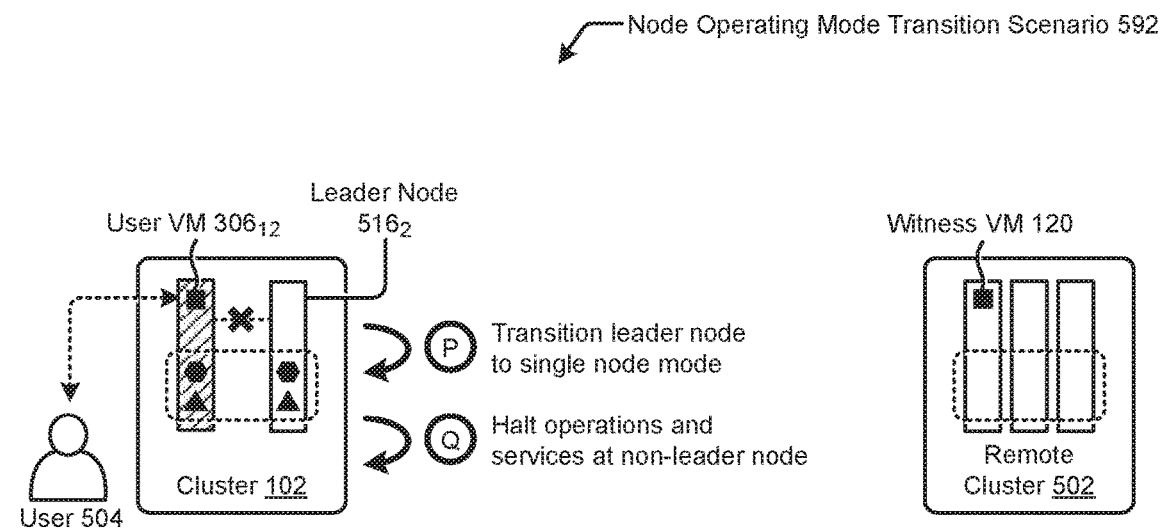

As shown in node communication failure scenario 590 of FIG. 5C illustrates certain operations pertaining to detecting an intra-cluster communication failure (e.g., node-to-node communication failure) at cluster 102 (operation L). As shown, user 504 might be interacting with user VM $306_{12}$ at the time of the failure event. In the case of an intra-cluster communication failure, the nodes at cluster 102 might not know the state of the other node so that each will issue a leadership request to witness VM 120 at remote cluster 502 (operation M). According to the herein disclosed techniques, a single leader node is selected at the witness VM 120 even in the presence of the multiple leadership requests (operation N). The selected leader node receives the leadership lock from the witness VM 120 (operation O).

As shown in node operating mode transition scenario 592 of FIG. 5C, the leader node $516_2$ at cluster 102, as selected by witness VM 120, transitions to a single-node mode (operation P). The node that did not receive the leadership lock (e.g., the non-leader node) will halt operations and services (operation Q). In this case, for example, user 504 will not have access to user VM $306_{12}$.

In some embodiments such as is depicted in FIG. 3, a first node (e.g., node $104_1$) hosts a hypervisor of a first type (e.g., hypervisor-E 307) and a second node (e.g., node $104_2$) hosts a hypervisor of a second type (e.g., hypervisor-A 308). In such configurations, acts pertaining to halting (e.g., by a node that did not receive the leadership lock), or acts pertaining to invoking DR operations (e.g., initiating a failover) in response to the failure, can be facilitated in a hypervisor-agnostic manner by the controller VM running on the respective node. Specifically, the controller VM on the node that did not receive the leadership lock can issue a hypervisor-agnostic halt command to the hypervisor of the first type, and the controller VM on the node that did receive the leadership lock can issue a hypervisor-agnostic command to the hypervisor of the second type.

Figure 5D:
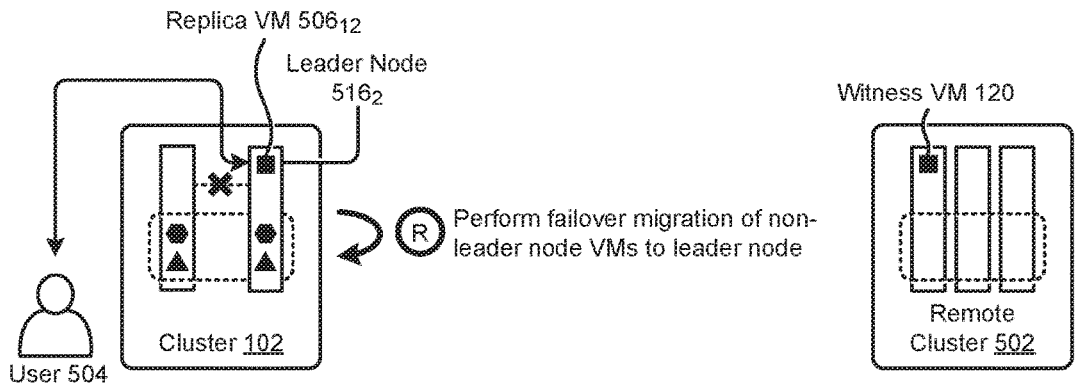
Figure 5D:
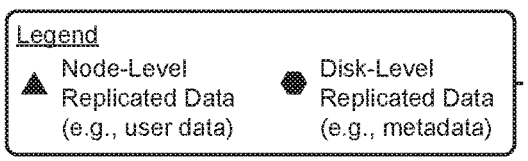
Figure 5D:
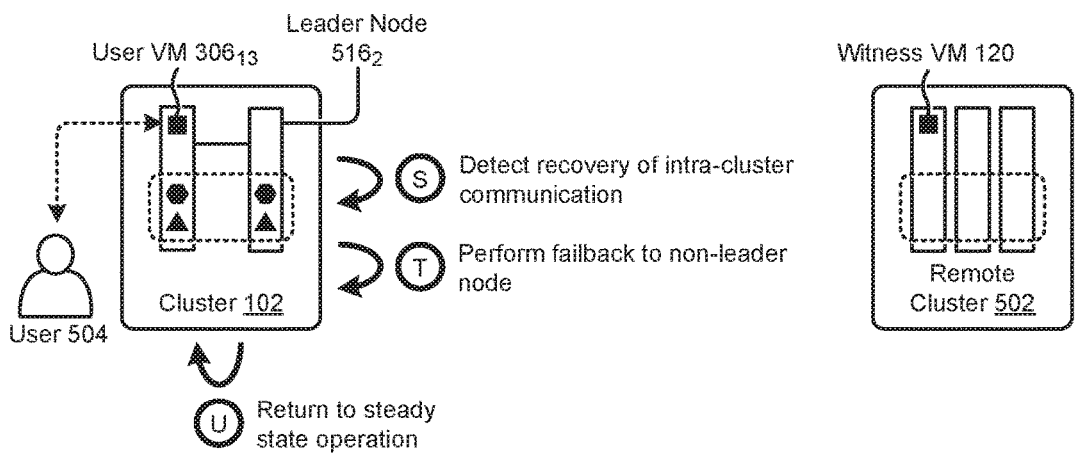

As shown in intra-cluster failover scenario 594 of FIG. 5D, the nodes of cluster 102 might be configured to facilitate a failover migration of the virtualized entities (e.g., VMs) of the non-leader node to the leader node $516_2$ (operation R). For example, if the nodes are configured to limit node resource usage to a maximum of 40% and maintain a node-level replication factor of at least two, an intra-cluster failover is possible (e.g., the remote cluster 502 comprising the witness VM 120 is not required for the failover). In this case, user 504 can continue working on a replica VM $506_{12}$ at the leader node $516_2$ that was failed over from the non-leader node.

As shown in intra-cluster failback scenario 596 of FIG. 5D, when the recovery from the intra-cluster communication failure is detected (operation S), a failback from the leader node $516_2$ to the non-leader node is performed (operation T) and the nodes in cluster 102 return to a steady state operation (operation U). As an example, user 504 can again access an instance of a VM (e.g., user VM $306_{13}$) operating at the earlier halted node of cluster 102.

Other disaster recovery scenarios in two-node computing clusters as facilitated by the herein disclosed techniques are possible. For example, if the external communication between the witness VM and one of the nodes of the two-node cluster fails, an alert is issued to the node unable to access the witness VM. In this case, the cluster is otherwise unaffected, and no user intervention is required. If the witness VM fails, or the external communications from the witness VM to both nodes of the cluster fail, an alert is generated but the cluster is otherwise unaffected. When a complete network failure occurs (e.g., no intra-cluster or external communications), the overall cluster becomes unavailable and user intervention may be necessary to return the cluster to steady state operation.

Additional Embodiments of the Disclosure

Additional Practical Application Examples

Figure 6A:
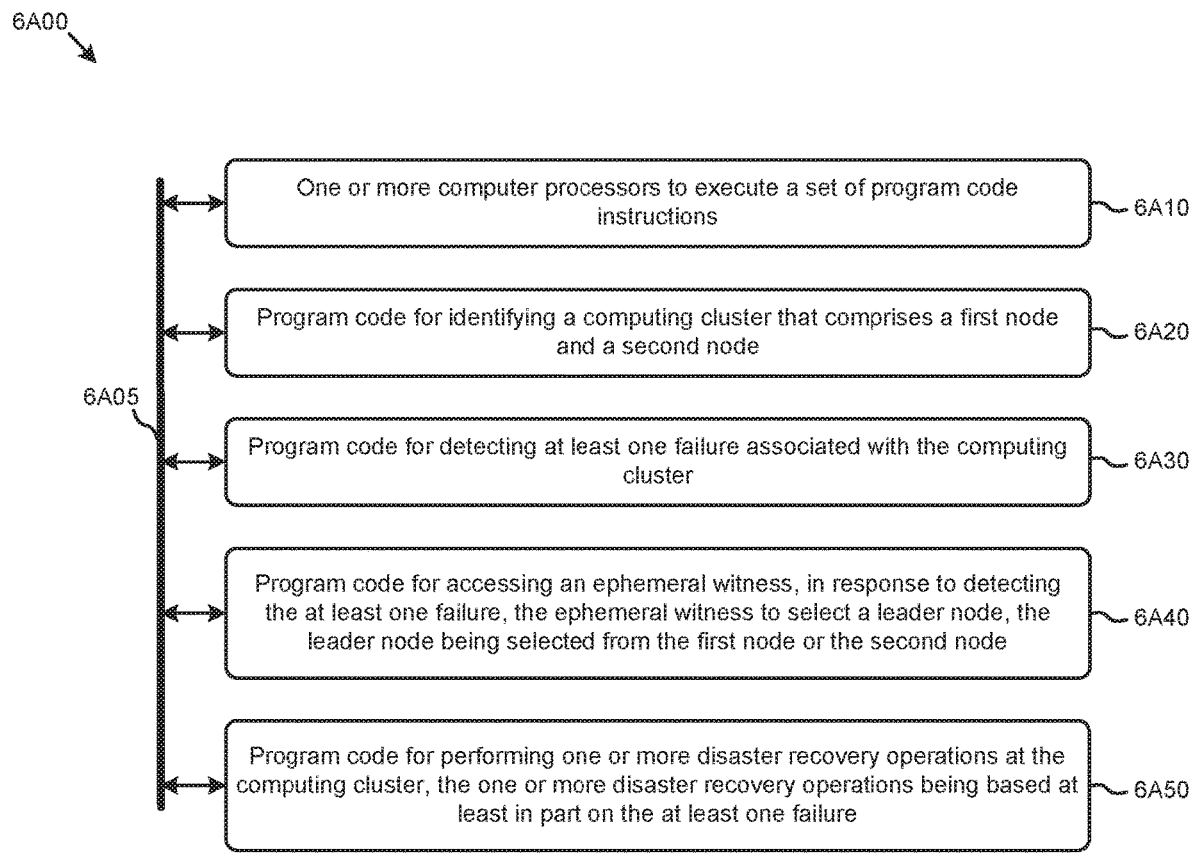
FIG. 6A and FIG. 6B depict a set of system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. This and other embodiments present particular arrangements of elements that, individually and/or as combined, serve to form improved technological processes that address implementing disaster recovery capabilities in two-node computing clusters. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising one or more computer processors to execute a set of program code instructions (module 6A10) and modules for accessing memory to hold program code instructions to perform: identifying a computing cluster that comprises a first node and a second node (module 6A20); detecting at least one failure associated with the computing cluster (module 6A30); accessing an ephemeral witness in response to detecting the at least one failure, the ephemeral witness to select a leader node, the leader node being selected from the first node or the second node (module 6A40); and performing one or more disaster recovery operations at the computing cluster, the one or more disaster recovery operations being based at least in part on the at least one failure (module 6A50).

Variations of the foregoing may include more or fewer of the shown modules. Certain variations may perform more or fewer (or different) steps and/or certain variations may use data elements in more or in fewer (or different) operations.

Still further, some embodiments include variations in the operations performed, and some embodiments include variations of aspects of the data elements used in the operations.

Figure 6B:
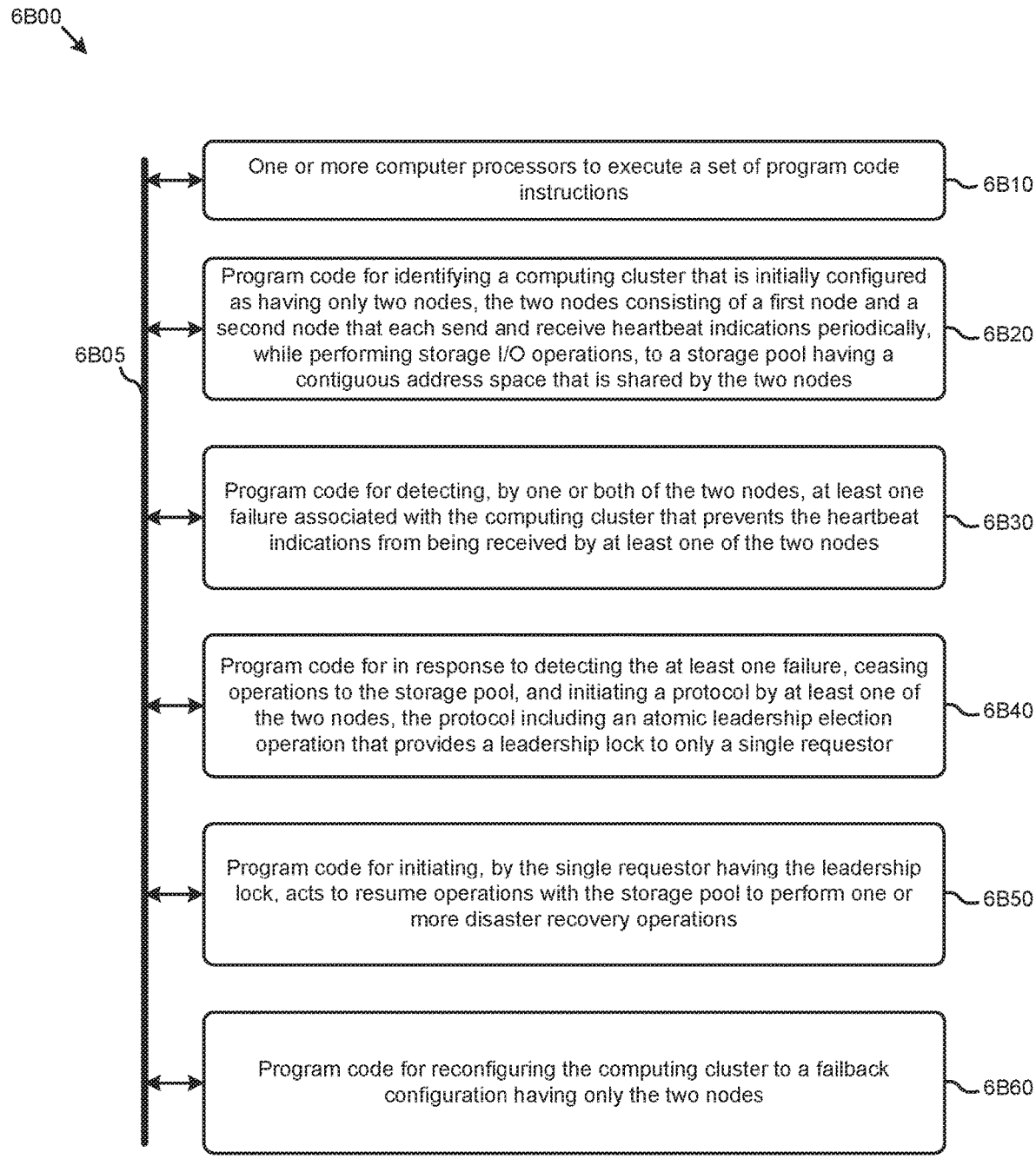

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising one or more computer processors to execute a set of program code instructions (module 6B10) and modules for accessing memory to hold program code instructions to perform: identifying a computing cluster that is initially configured as having only two nodes, the two nodes consisting of a first node and a second node that each send and receive heartbeat indications periodically, while performing storage I/O operations, to a storage pool having a contiguous address space that is shared by the two nodes (module 6B20); detecting, by one or both of the two nodes, at least one failure associated with the computing cluster that prevents the heartbeat indications from being received by at least one of the two nodes (module 6B30); in response to detecting the at least one failure, ceasing operations to the storage pool, and initiating a protocol by at least one of the two nodes, the protocol including an atomic leadership election operation that provides a leadership lock to only a single requestor (module 6B40); initiating, by the single requestor having the leadership lock, acts to resume operations with the storage pool to perform one or more disaster recovery operations (module 6B50); and reconfiguring the computing cluster to a failback configuration having only the two nodes (module 6B60).

System Architecture Overview

Additional System Architecture Examples

Figure 7A:
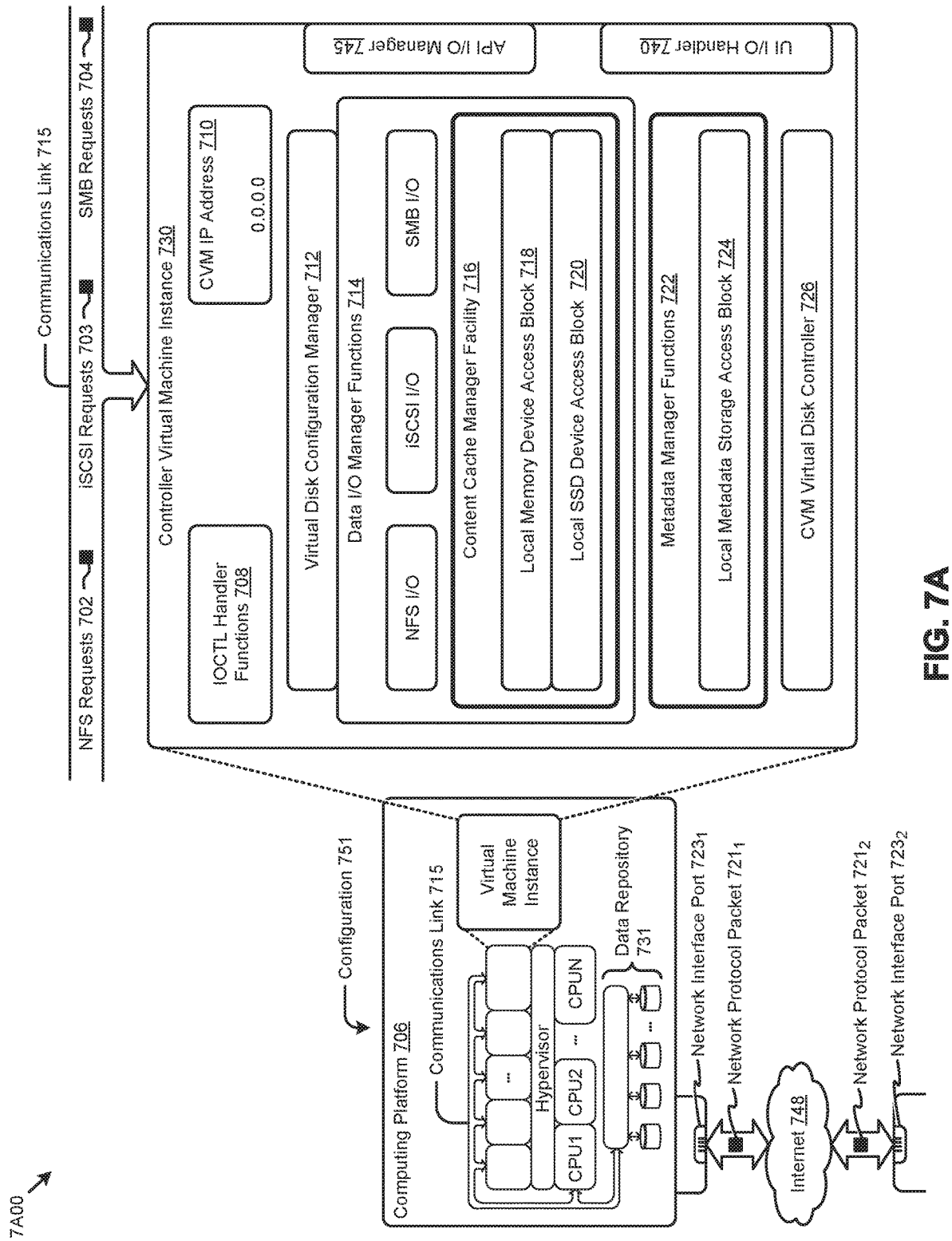
FIG. 7A, FIG. 7B, and FIG. 7C depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or IO) can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or persistent random access memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). External data repository 731 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 724. External data repository 731 can be configured using CVM virtual disk controller 726, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port 723$_1$ and network interface port 723$_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet 721$_1$ and network protocol packet 721$_2$).

Computing platform 706 may transmit and receive messages that can be composed of configuration data and/or any other forms of data and/or instructions organized into a data structure (e.g., communications packets). In some cases, the data structure includes program code instructions (e.g., application code) communicated through the Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or the results of executing program code can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to disaster recovery of two-node computing clusters. In some embodiments, a module may include one or more state machines and/or combinational logic used to implement or facilitate the operational and/or performance characteristics pertaining to disaster recovery of two-node computing clusters.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of disaster recovery of two-node computing clusters). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to disaster recovery of two-node computing clusters, and/or for improving the way data is manipulated when performing computerized operations pertaining to implementing a leader selection protocol in a disaster recovery framework for two-node computing clusters.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
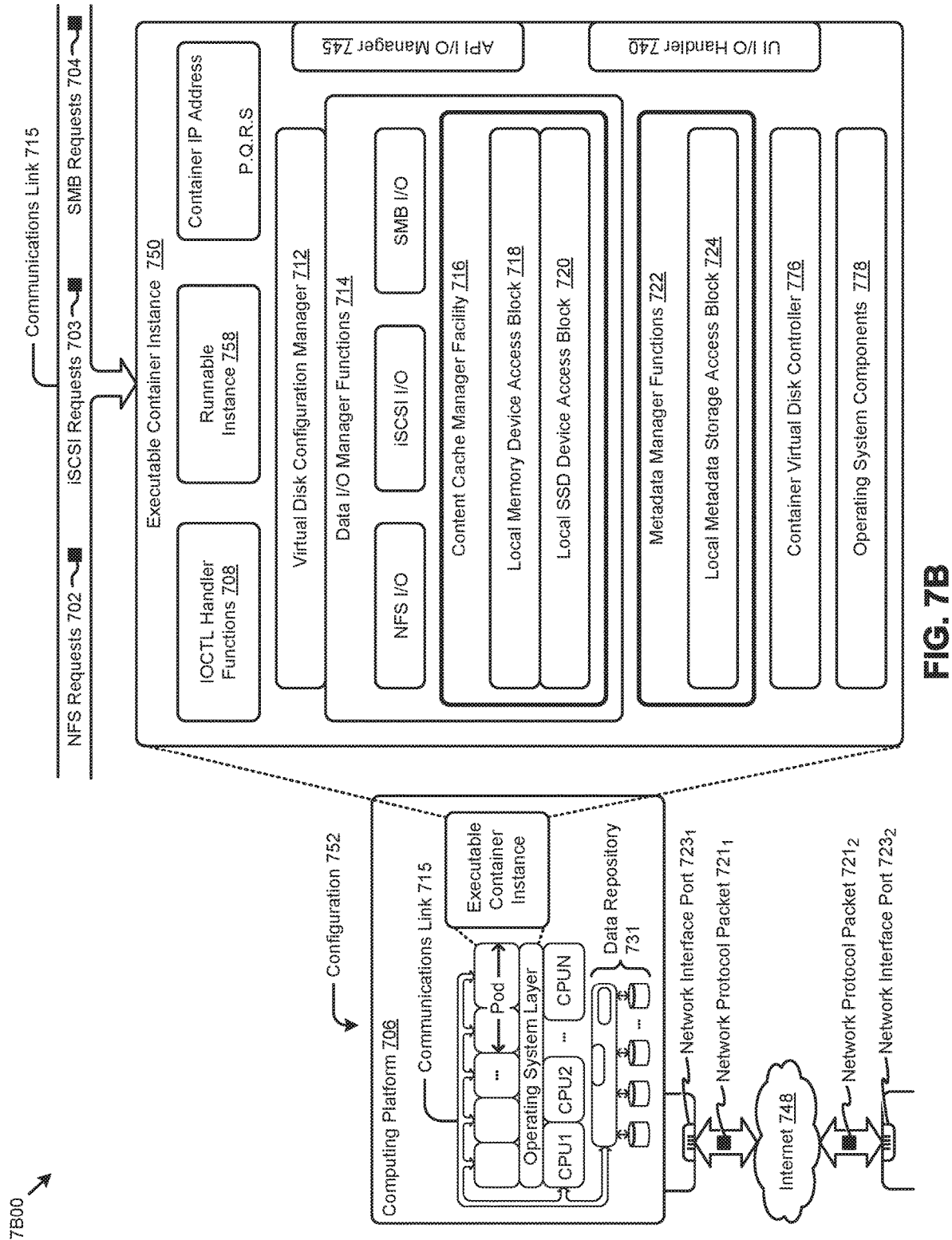

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls -a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
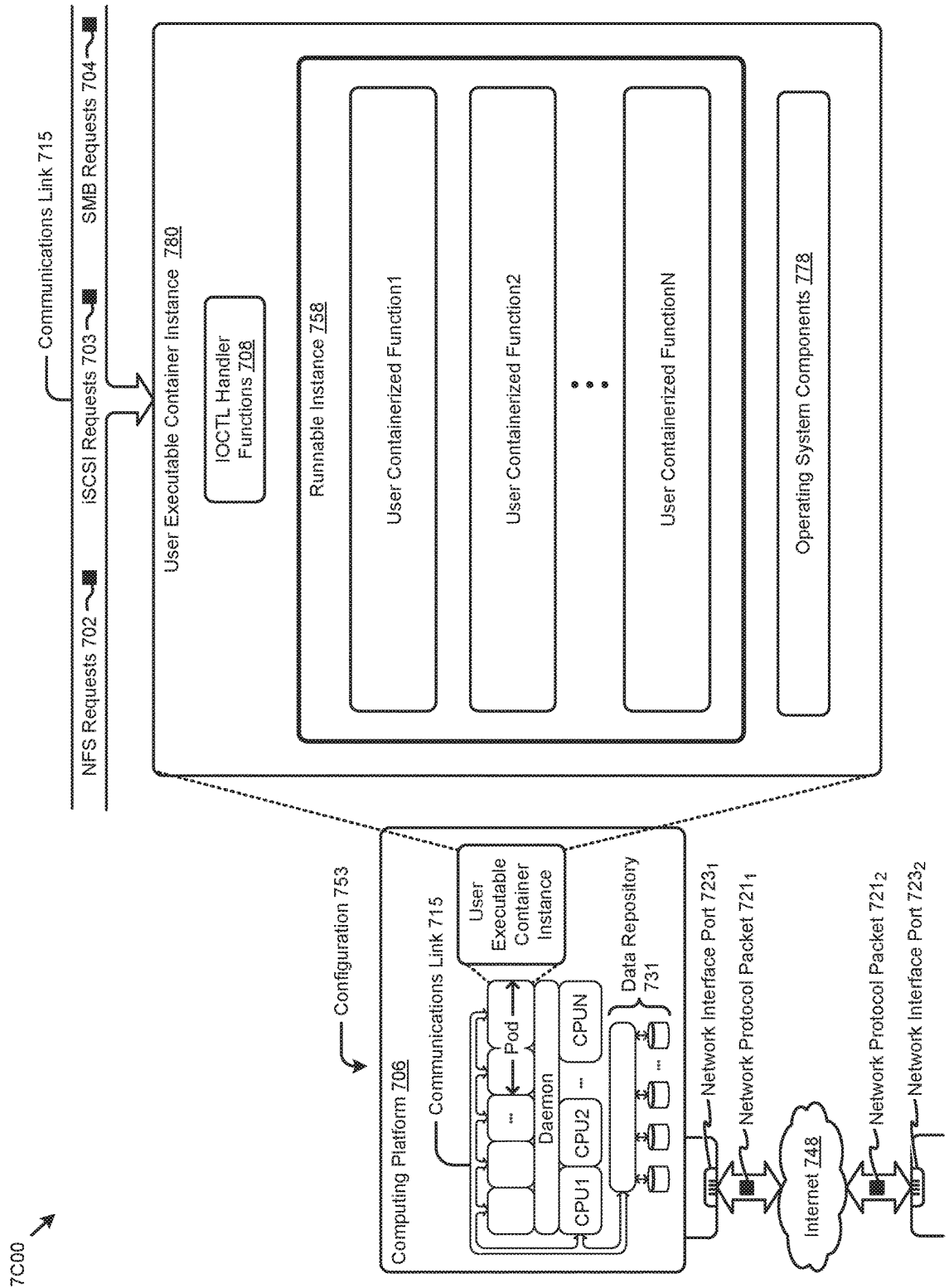

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown external data repository 731 and/or any forms of network accessible storage. As such, the multiple tiers of storage may include storage that is accessible over communications link 715. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   detecting a failure condition between a first node and a second node in a computing cluster that comprises a storage resource that is accessed by the first and second nodes;
   electing a new leader using a witness on an on-demand basis to elect a new leader by:
      issuing a leadership request,
      creating an instance of the witness in response to receipt of the leadership request, and
      accessing the instance of the witness to perform an atomic leadership election operation to form a quorum that includes the instance of the witness, wherein the atomic leadership election operation provides a leadership lock to only a single requestor, the single requestor corresponding to only one of the first or second nodes, and the instance of the witness is destroyed after said atomic leadership election operation has completed; and
   initiating, by the single requestor having the leadership lock, a disaster recovery operation for the computing cluster.

2. The method of claim 1, wherein the leadership request is received at an arbiter in the instance of the witness, and the atomic leadership election operation is performed over a data value to establish the leadership lock.

3. The method of claim 1, wherein the atomic leadership election operation is associated with at least one of, a compare-and-swap operation, or a semaphore.

4. The method of claim 1, wherein the witness comprises a witness virtual machine.

5. The method of claim 1, wherein the instance of the witness is in a different computing cluster from the computing cluster for the first and second nodes, and the computing cluster operates within a first failure domain and the instance of the witness operates within a second failure domain.

6. The method of claim 1, wherein the disaster recovery operation comprises at least one of, a node operating mode transition operation, a failover operation, or a failback operation, and the disaster recovery operation specifies at least one of, a node-level replication factor, a disk-level replication factor, a resource usage level, a recovery point objective, a network latency limit, an SSD, or an HDD.

7. The method of claim 6, wherein the failover operation corresponds to a failover to at least one of, a remote cluster, or an active node in the computing cluster and the disaster recovery operation is invoked over a hypervisor-agnostic communication channel.

8. The method of claim 1, wherein the instance of the witness comprises a witness virtual machine and the instance of the witness is in a different computing cluster from the computing cluster for the first and second nodes.

9. A non-transitory computer readable medium having stored thereon a sequence of instructions which, when executed by a processor causes the processor to perform a process comprising:
   detecting a failure condition between a first node and a second node in a computing cluster that comprises a storage resource that is accessed by the first and second nodes;
   electing a new leader using a witness created on an on-demand basis by:
      issuing a leadership request,
      creating an instance of the witness in response to receipt of the leadership request, and
      accessing the instance of the witness to perform an atomic leadership election operation to form a quorum that includes the instance of the witness, wherein the atomic leadership election operation provides a leadership lock to only a single requestor, the single requestor corresponding to only one of the first or second nodes, and the instance of the witness is destroyed after said atomic leadership election operation has completed; and
   initiating, by the single requestor having the leadership lock, a disaster recovery operation for the computing cluster.

10. The computer readable medium of claim 9, wherein the leadership request is received at an arbiter in the instance of the witness, and the atomic leadership election operation is performed over a data value to establish the leadership lock.

11. The computer readable medium of claim 9, wherein the atomic leadership election operation is associated with at least one of, a compare-and-swap operation, or a semaphore.

12. The computer readable medium of claim 9, wherein the witness comprises a witness virtual machine.

13. The computer readable medium of claim 9, wherein the instance of the witness comprises a witness virtual machine and the instance of the witness is in a different computing cluster from the computing cluster for the first and second nodes.

14. The computer readable medium of claim 9, wherein the instance of the witness is in a different computing cluster from the computing cluster for the first and second nodes, and the computing cluster operates within a first failure domain and the instance of the witness operates within a second failure domain.

15. The computer readable medium of claim 9, wherein the disaster recovery operation comprises at least one of, a node operating mode transition operation, a failover operation, or a failback operation, and the disaster recovery operation specifies at least one of, a node-level replication factor, a disk-level replication factor, a resource usage level, a recovery point objective, a network latency limit, an SSD, or an HDD.

16. The computer readable medium of claim 15, wherein the failover operation corresponds to a failover to at least one of, a remote cluster, or an active node in the computing cluster and the disaster recovery operation is invoked over a hypervisor-agnostic communication channel.

17. A system for disaster recovery of two-node computing clusters, the system comprising:
   a storage medium having stored thereon a sequence of instructions; and
   a processor that executes the sequence of instructions to cause the processor to perform a process comprising,
      detecting a failure condition between a first node and a second node in a computing cluster that comprises a storage resource that is accessed by the first and second nodes;
      electing a new leader using a witness on an on-demand basis by:
         issuing a leadership request,
         creating an instance of the witness in response to receipt of the leadership request, and
         accessing the instance of the witness to perform an atomic leadership election operation is to form a quorum that includes the instance of the witness, wherein the atomic leadership election operation provides a leadership lock to only a single requestor, the single requestor corresponding to only one of the first or second nodes, and the instance of the witness is destroyed after said atomic leadership election operation has completed; and
      initiating, by the single requestor having the leadership lock, a disaster recovery operation for the computing cluster.

18. The system of claim 17, wherein the witness comprises a witness virtual machine.

19. The system of claim 17, wherein the leadership request is received at an arbiter in the instance of the witness, and the atomic leadership election operation is performed over a data value to establish the leadership lock.

20. The system of claim 17, wherein the atomic leadership election operation is associated with at least one of, a compare-and-swap operation, or a semaphore.

21. The system of claim 17, wherein the instance of the witness comprises a witness virtual machine and the instance of the witness is in a different computing cluster from the computing cluster for the first and second nodes.

22. The system of claim 17, wherein the instance of the witness is in a different computing cluster from the computing cluster for the first and second nodes, and the computing cluster operates within a first failure domain and the instance of the witness operates within a second failure domain.

23. The system of claim 17, wherein the disaster recovery operation comprises at least one of, a node operating mode transition operation, a failover operation, or a failback operation, and the disaster recovery operation specifies at least one of, a node-level replication factor, a disk-level replication factor, a resource usage level, a recovery point objective, a network latency limit, an SSD, or an HDD.

24. The system of claim 23, wherein the failover operation corresponds to a failover to at least one of, a remote cluster, or an active node in the computing cluster and the disaster recovery operation is invoked over a hypervisor-agnostic communication channel.

* * * * *